United States Patent
Ishigami et al.

(10) Patent No.: US 9,496,773 B2
(45) Date of Patent: Nov. 15, 2016

(54) ROTATING ELECTRICAL MACHINE AND METHOD FOR MANUFACTURING ROTATING ELECTRICAL MACHINE

(71) Applicant: Hitachi Automotive Systems, Ltd., Hitachinaka-shi, Ibaraki (JP)

(72) Inventors: Takashi Ishigami, Tokyo (JP); Yutaka Matsunobu, Hitachinaka (JP); Yoshimi Mori, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 295 days.

(21) Appl. No.: 14/364,247

(22) PCT Filed: Dec. 13, 2012

(86) PCT No.: PCT/JP2012/082407
§ 371 (c)(1),
(2) Date: Jun. 10, 2014

(87) PCT Pub. No.: WO2013/121668
PCT Pub. Date: Aug. 22, 2013

(65) Prior Publication Data
US 2014/0346915 A1    Nov. 27, 2014

(30) Foreign Application Priority Data

Feb. 14, 2012   (JP) .................................. 2012-029670

(51) Int. Cl.
*H02K 3/04* (2006.01)
*H02K 15/02* (2006.01)
(Continued)

(52) U.S. Cl.
CPC ........... *H02K 15/024* (2013.01); *B60L 3/0061* (2013.01); *B60L 11/005* (2013.01); *B60L 11/123* (2013.01);
(Continued)

(58) Field of Classification Search
CPC ................................ H02K 15/024; H02K 3/12
(Continued)

(56) References Cited

U.S. PATENT DOCUMENTS 6,459,177 B1 * 10/2002 Nakamura ............... H02K 3/12
 310/201
2002/0033649 A1   3/2002 Oohashi et al.
(Continued)

FOREIGN PATENT DOCUMENTS

JP         3-159221 A      7/1991
JP     2000-295821 A    10/2000
(Continued)

OTHER PUBLICATIONS

International Search Report (PCT/ISA/210) dated Jan. 29, 2013 (Five (5) pages).

*Primary Examiner* — Hanh Nguyen
(74) *Attorney, Agent, or Firm* — Crowell & Moring LLP

(57) ABSTRACT

A rotating electrical machine includes a stator and a rotor. The stator winding includes a plurality of conductor segments inserted through the slots from one end surface of the stator core with end portions of the conductor segments projecting out beyond another end surface of the stator core. The conductor segments include an undeformed portion, a plastically deformed portion formed at the end portions thereof and a tapered portion. The plastically deformed portion has a dimension of the plastically deformed portion along a circumferential direction that is greater than a dimension of the undeformed portion along the circumferential direction and so that a dimension of the plastically deformed portion along a radial direction is smaller than a dimension of the undeformed portion along the radial direction. The conductor segments are welded together at tops of the plastically deformed portions thereof.

6 Claims, 18 Drawing Sheets

(51) Int. Cl.

| | | |
|---|---|---|
| *H02K 15/00* | (2006.01) | |
| *H02K 15/06* | (2006.01) | |
| *B60L 3/00* | (2006.01) | |
| *B60L 11/00* | (2006.01) | |
| *B60L 11/12* | (2006.01) | |
| *B60L 11/14* | (2006.01) | |
| *B60L 11/18* | (2006.01) | |
| *B60L 15/00* | (2006.01) | |
| *H02K 3/12* | (2006.01) | |
| *H02K 3/50* | (2006.01) | |

(52) U.S. Cl.
CPC ............ *B60L 11/14* (2013.01); *B60L 11/1861* (2013.01); *B60L 11/1864* (2013.01); *B60L 11/1868* (2013.01); *B60L 15/007* (2013.01); *H02K 15/0031* (2013.01); *H02K 15/0081* (2013.01); *H02K 15/064* (2013.01); *B60L 2220/14* (2013.01); *B60L 2220/50* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/547* (2013.01); *B60L 2240/549* (2013.01); *H02K 3/12* (2013.01); *H02K 3/50* (2013.01); *H02K 2213/03* (2013.01); *Y02T 10/6217* (2013.01); *Y02T 10/641* (2013.01); *Y02T 10/645* (2013.01); *Y02T 10/7005* (2013.01); *Y02T 10/7022* (2013.01); *Y02T 10/7044* (2013.01); *Y02T 10/7061* (2013.01); *Y02T 10/7066* (2013.01); *Y02T 10/7077* (2013.01); *Y10T 29/49012* (2015.01)

(58) Field of Classification Search
USPC .......................................... 310/201; 29/596
See application file for complete search history.

(56) References Cited

U.S. PATENT DOCUMENTS

| | | |
|---|---|---|
| 2003/0024101 A1 | 2/2003 | Tokizawa et al. |
| 2003/0127935 A1 | 7/2003 | Mori et al. |
| 2003/0135980 A1 | 7/2003 | Ichikawa et al. |
| 2006/0267440 A1* | 11/2006 | Sakai ...................... H02K 3/12 310/184 |
| 2008/0148551 A1 | 6/2008 | Hara |
| 2012/0133235 A1* | 5/2012 | Ogihara ................. H02K 3/12 310/208 |
| 2013/0169103 A1* | 7/2013 | Chamberlin ....... H02K 15/0087 310/216.001 |

FOREIGN PATENT DOCUMENTS

| | | |
|---|---|---|
| JP | 2000-350422 A | 12/2000 |
| JP | 2002-95198 A | 3/2002 |
| JP | 2003-204647 A | 7/2003 |
| JP | 2003-219588 A | 7/2003 |
| JP | 2004-072838 A | 4/2004 |
| JP | 2008-154433 A | 7/2006 |
| JP | 2010-130709 A | 6/2010 |

* cited by examiner

ROTATING ELECTRICAL MACHINE AND METHOD FOR MANUFACTURING ROTATING ELECTRICAL MACHINE

TECHNICAL FIELD

The present invention relates to a rotating electrical machine and a method for manufacturing a rotating electrical machine.

BACKGROUND ART

There is a rotating electrical machine known in the related art, which includes a stator winding, achieved by joining end portions of each conductor segment with one another, mounted at a stator core (see patent literature 1). Patent literature 1 discloses a stator manufacturing method for manufacturing a stator in a rotating electrical machine that includes a step in which end portions of conductor segments with an insulating film formed thereupon are plastically deformed by pressurizing the end portions with a die and a subsequent step in which the insulating film, located toward the tips of the end portions, is removed.

Once the insulating film at the end portions is removed, the conductor segments are each formed into a substantially U-shape through a bending process. The end portions of the conductor segments having been formed into the substantially U-shape are inserted through slots from one end surface of the stator core and are made to project out through another end surface of the stator core. The end portions of conductor segments adjacent to each other are pressurized and arc-welded. As a plurality of substantially U-shaped conductor segments are joined, a stator with a stator winding mounted at the stator core is manufactured.

The manufacturing method disclosed in patent literature 1, in which the end portions of the conductor segments having an insulating film formed thereupon are plastically deformed, assures reliable adhesion for the insulating film shielding the tips of each conductor segment. The manufacturing method described in patent literature 1, which allows the conductor segments to assume a small sectional area at the ends thereof, reduces the heat input during the joining process. This, in turn, keeps down the temperature in the areas near the conductor segment end portions and ultimately prevents deterioration of the insulation performance on the base side of the end portions that would otherwise occur due to degradation of the insulating film.

CITATION LIST

Patent Literature

Patent literature 1: Japanese Laid Open Patent Publication No. 2002-95198

SUMMARY OF THE INVENTION

Technical Problem

While the end portions of the conductor segments are normally joined through TIG welding or plasma arc welding, blowholes tend to be formed readily in the weld metal due to water vapor generated by hydrogen in the atmosphere and oxygen contained in the base material during the welding process.

The formation of the blowholes in the weld metal can be effectively reduced by allowing the weld metal to solidify over a greater length of time thereby creating a greater window of opportunity for releasing the water vapor generated in the welding process to the outside. However, since no measures for blowhole reduction are disclosed in patent literature 1, the art taught in patent literature 1 may give rise to a concern that the volume ratio of blowholes formed within the weld metal may become significant.

In addition, since the sectional area of the end portions of the conductor segments disclosed in patent literature 1 is reduced through plastic deformation, it is bound to be difficult to form a weld metal achieving sufficient size, which gives rise to a concern that a sufficient joint strength between the individual conductor segments may not be achieved.

Solution to Problem

A rotating electrical machine, according to a first aspect of the present invention comprises: a stator including a stator winding made up with a plurality of conductor segments each constituted with flat wire formed into a substantially U-shape installed through a plurality of slots formed in a stator core; and a rotor rotatably disposed at an inner side of the stator, wherein: the stator winding includes the plurality of conductor segments inserted through the slots from one end surface of the stator core with end portions of the conductor segments projecting out beyond another end surface of the stator core, and is formed by welding an end portion of each conductor segment, among the plurality of conductor segments, with an adjacent end portion of another conductor segment; the conductor segments each include an undeformed portion, a plastically deformed portion formed at the end portions thereof and a tapered portion formed between the undeformed portion and the plastically deformed portion; the plastically deformed portion is formed so that a dimension of the plastically deformed portion, measured along a circumferential direction of the stator, is greater than a dimension of the undeformed portion measured along the circumferential direction of the stator and so that a dimension of the plastically deformed portion, measured along a radial direction of the stator, is smaller than a dimension of the undeformed portion measured along the radial direction of the stator; and the conductor segments are welded together at tops of the plastically deformed portions thereof.

According to a second aspect of the present invention, in the rotating electrical machine according to the first aspect, it is preferable that bd, representing the dimension of the plastically deformed portion measured along the circumferential direction of the stator, and bp, representing the dimension of the undeformed portion measured along the circumferential direction of the stator, achieve a relationship expressed as; $bd/bp \geq 1.3$.

According to a third aspect of the present invention, in the rotating electrical machine according to the first or second aspect, it is preferable that ad, representing the dimension of the plastically deformed portion measured along the radial direction of the stator, and bd, representing the dimension of the plastically deformed portion measured along the circumferential direction of the stator, achieve a relationship expressed as; $(2 \times ad)/bd \leq 2.5$.

According to a fourth aspect of the present invention, in a method for manufacturing a rotating electrical machine according to any one of the first to third aspects, after the conductor segments are inserted through the slots from the one end surface of the stator core so as to allow the end portions thereof to project out beyond the other end surface of the stator core, the end portions are compressed along the radial direction of the stator so as to form the plastically deformed portion and the tapered portion.

According to a fifth aspect of the present invention, a method for manufacturing a rotating electrical machine that includes a stator, including a stator winding made up with a plurality of conductor segments each constituted with flat wire formed into a substantially U-shape installed through a plurality of slots formed in a stator core, and a rotor, rotatably disposed at an inner side of the stator, comprises: a plastic deformation step in which a plastically deformed portion is formed by compressing end portions of the conductor segments alternately along a radial direction of the stator and along a circumferential direction of the stator; a conductor insertion step in which the conductor segments are inserted through the slots from one end surface of the stator core and the plastically deformed portion is made to project out beyond another end surface of the stator core; and a welding step in which the plastically deformed portions set adjacent to each other among the plurality of conductor segments are welded together at tops thereof.

According to a sixth aspect of the present invention, in the method for manufacturing a rotating electrical machine according to the fifth aspect, it is preferable that in the plastic deformation step, the end portions of the conductor segments are deformed by first compressing the end portions of the conductor segments along the radial direction of the stator and then by compressing the end portions of the conductor segments along the circumferential direction of the stator.

Advantageous Effect of the Invention

According to the present invention, an improvement in the bond strength, with which conductor segments are joined with one another, can be achieved by reducing blowholes formed in the weld metal connecting the end portions of conductor segments adjacent to each other.

DESCRIPTION OF EMBODIMENTS

The following is a description of embodiments of the present invention, given in reference to drawings.

First Embodiment

A rotating electrical machine manufactured by adopting the manufacturing method according to the present invention may be adopted in a pure electric vehicle engaged in traveling operation exclusively on a rotating electrical machine or in a hybrid-type electric vehicle driven both by an engine and a rotating electrical machine. The following description is given by assuming that the present invention is adopted in a hybrid electric vehicle.

Figure 1:
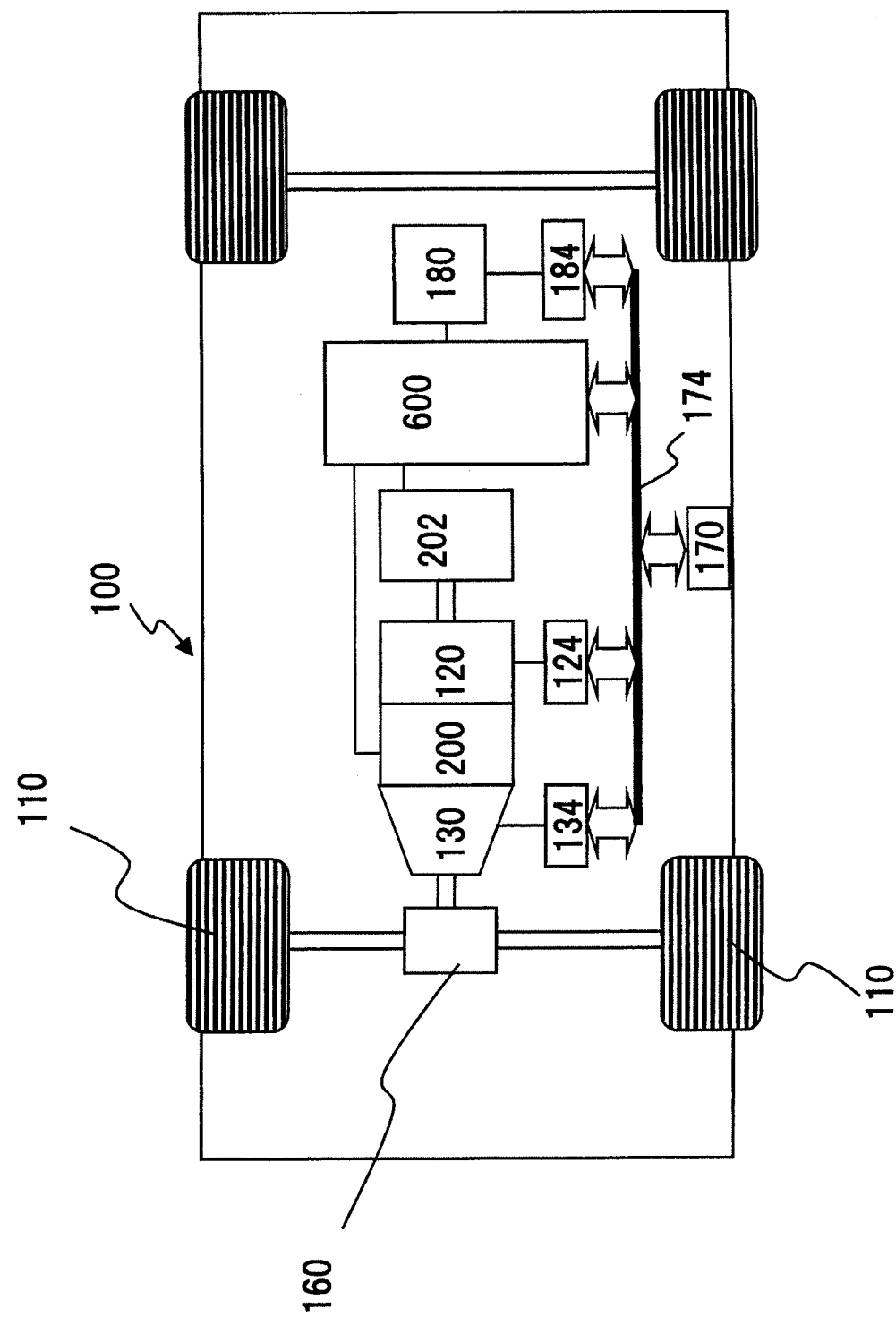
FIG. 1 A schematic illustration showing the structure of a hybrid electric vehicle having a rotating electrical machine achieved in a first embodiment of the present invention installed therein FIG. 2 A circuit diagram pertaining to a power conversion device in FIG. 1

FIG. 1 is a schematic illustration of the structure of a hybrid electric vehicle having the rotating electrical machine achieved in the first embodiment of the present invention installed therein.

An engine 120, a first rotating electrical machine 200, a second rotating electrical machine 202 and a battery 180 are mounted at a hybrid electric vehicle (hereafter simply referred to as a vehicle) 100, as shown in FIG. 1.

The battery 180, constituted with secondary battery cells, such as lithium ion battery cells or nickel metal hydride cells, or capacitors, is capable of outputting high-voltage DC power in a range of 250 to 600 v or higher. The battery 180 provides DC power to the rotating electrical machines 200 and 202 when the vehicle is in a power running state, whereas it receives DC power from the rotating electrical machines 200 and 202 during a regenerative traveling operation. The battery 180 and the rotating electrical machines 200 and 202 exchange DC power via a power conversion device 600.

A battery (not shown) that provides low-voltage power (e.g., 14 V power) is installed in the vehicle 100 so as to supply DC power to the control circuits to be described below.

Rotational torque generated via the engine 120 and the rotating electrical machines 200 and 202 is transmitted to front wheels 110 via a transmission 130 and a differential gear unit 160. The transmission 130 is controlled by a transmission control device 134, whereas the engine 120 is controlled by an engine control device 124. Charge/discharge of the battery 180 is controlled by a battery control device 184.

The transmission control device 134, the engine control device 124, the battery control device 184, and the power conversion device 600 are connected with an integrated control device 170 via a communication line 174.

The integrated control device 170 individually receives information input thereto via the communication line 174, indicating the states of the transmission control device 134, the engine control device 124, the power conversion device 600 and the battery control device 184. Based upon the information thus received, the integrated control device 170 generates through arithmetic operation a control command for each corresponding control device. The control command generated through the arithmetic operation is then transmitted to the particular control device via the communication line 174.

The battery control device 184 outputs, via the communication line 174, information indicating the state of charge/discharge in the battery 180 and the states of the individual battery cell units constituting the battery 180 to the integrated control device 170.

Upon deciding, based upon the information provided by the battery control device 184, that the battery 180 needs to be charged, the integrated control device 170 issues a power generation operation instruction for the power conversion device 600.

The integrated control device 170 manages torque outputs from the engine 120 and the rotating electrical machines 200 and 202, executes arithmetic processing to calculate the overall torque representing the sum of the torque output from the engine 120 and the torque outputs from the rotating electrical machines 200 and 202, and a torque distribution ratio, and transmits control commands generated based upon the arithmetic operation processing results to the transmission control device 134, the engine control device 124 and the power conversion device 600.

Based upon a torque command issued by the integrated control device 170, the power conversion device 600 controls the rotating electrical machines 200 and 202 so as to output torque or generate power as indicated in the command. The power conversion device 600 includes power semiconductor elements that constitute inverters. The power conversion device 600 controls switching operation of the power semiconductor elements based upon a command issued by the integrated control device 170. As the power semiconductor elements are engaged in the switching operation, the rotating electrical machines 200 and 202 are each driven as an electric motor or a power generator.

When engaging the rotating electrical machines 200 and 202 in operation as electric motors, DC power provided from the high-voltage battery 180 is supplied to DC terminals of the inverters in the power conversion device 600. The power conversion device 600 controls the switching operation of the power semiconductor elements so as to convert the DC power supplied to the inverters to three-phase AC power and provides the three-phase AC power to the rotating electrical machines 200 and 202.

When the rotating electrical machines 200 and 202 are each engaged in operation as a generator, the rotor of the rotating electrical machine is rotationally driven with a rotational torque applied thereto from the outside and thus, three-phase AC power is generated at a stator winding (stator coil). The three-phase AC power thus generated is converted to DC power in the power conversion device 600 and the high-voltage battery 180 is charged with the DC power supplied thereto.

Figure 2:
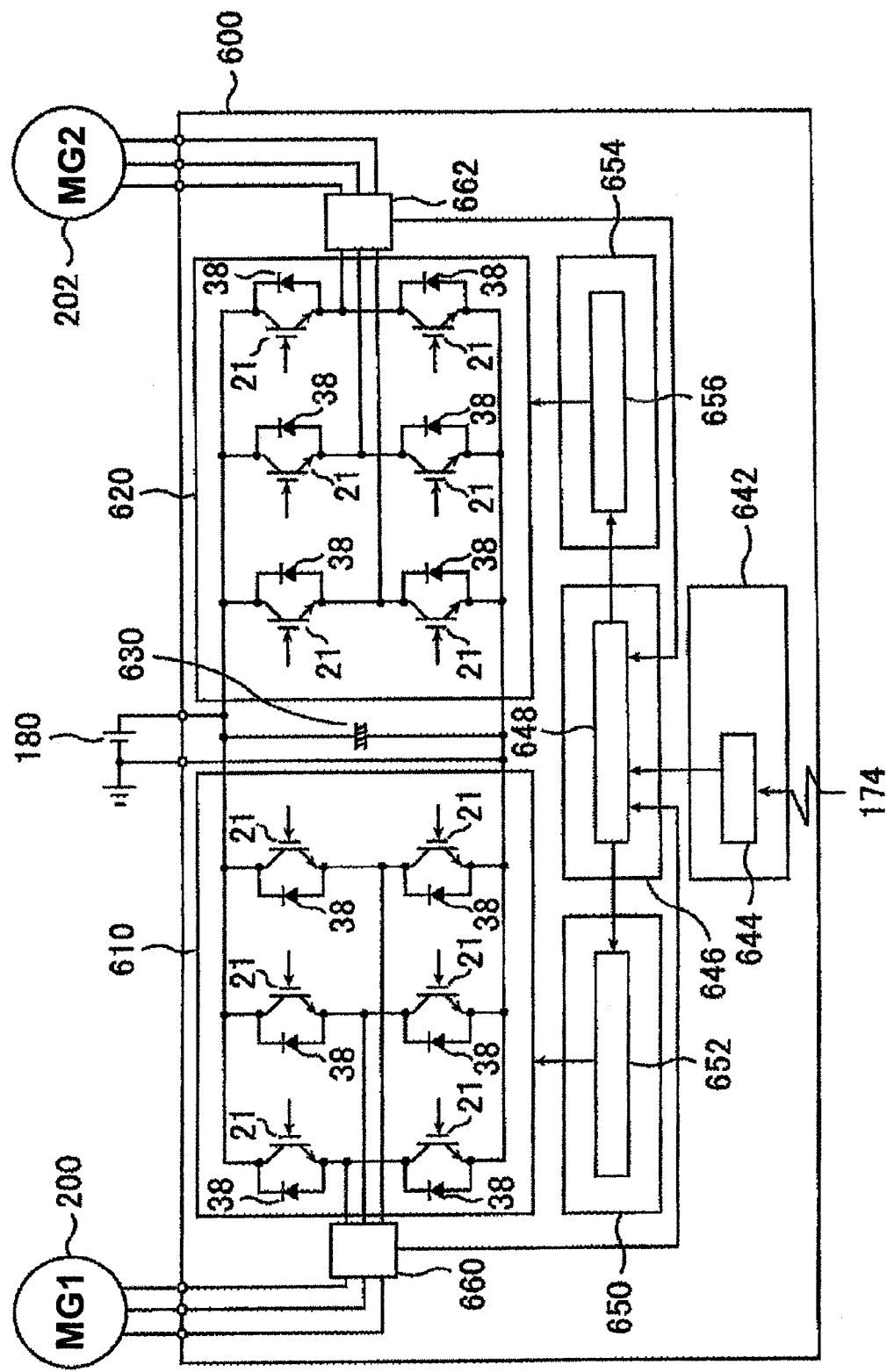

FIG. 2 is a circuit diagram pertaining to the power conversion device 600 shown in FIG. 1. The power conversion device 600 includes a first inverter device for the first rotating electrical machine 200 and a second inverter device for the second rotating electrical machine 202. The first inverter device comprises a power module 610, a first drive circuit 652 that controls switching operation of power semiconductor elements 21 in the power module 610 and a current sensor 660 that detects an electric current of the rotating electrical machine 200. The drive circuit 652 is disposed at a drive circuit substrate 650.

The second inverter device comprises a power module 620, a second drive circuit 656 that controls switching operation of power semiconductor elements 21 in the power module 620 and a current sensor 662 that detects an electric current of the rotating electrical machine 202. The drive circuit 656 is disposed at a drive circuit substrate 654.

A control circuit 648 configured on a control circuit substrate 646, a capacitor module 630 and a transmission/reception circuit 644 mounted on a connector substrate 642 are common circuits serving both the first inverter device and the second inverter device.

The power modules 610 and 620 are respectively engaged in operation in response to drive signals output from the corresponding drive circuits 652 and 656. The power modules 610 and 620 each convert the DC power provided from the battery 180 to three-phase AC power and provide the three-phase AC power resulting from the conversion to a stator winding constituting an armature winding of the corresponding rotating electrical machine 200 or 202. The power modules 610 and 620 also convert AC power induced at the stator windings of the rotating electrical machines 200 and 202 to DC power and provide the DC power resulting from the conversion to the high-voltage battery 180.

As indicated in FIG. 2, the power modules 610 and 620 each include a three-phase bridge circuit constituted with serial circuits each corresponding to one of the three phases, electrically connected in parallel between the positive pole side and the negative pole side of the battery 180. Each serial circuit includes a power semiconductor element 21 constituting an upper arm and a power semiconductor element 21 constituting a lower arm, and these power semiconductor elements 21 are connected in series.

Since the power module 610 and the power module 620 adopt circuit structures substantially identical to each other, as illustrated in the figure, the following description focuses on the power module 610 chosen as a representative example.

The switching power semiconductor elements used in the embodiment are IGBTs (insulated gate bipolar transistors). An IGBT includes three electrodes; a collector electrode, an emitter electrode and a gate electrode. A diode 38 is electrically connected between the collector electrode and the emitter electrode of the IGBT. The diode 38 includes two electrodes; a cathode electrode and an anode electrode, with the cathode electrode electrically connected to the collector electrode of the IGBT and the anode electrode electrically connected to the emitter electrode of the IGBT so as to define the direction running from the emitter electrode toward the collector electrode at the IGBT as a forward direction.

The upper and lower arms in the serial circuit corresponding to a given phase are configured by electrically connecting the emitter electrode of one IGBT and the collector electrode of another IGBT in series. It is to be noted that while the figure in reference to which the embodiment is described shows the upper arm and the lower arm corresponding to a given phase each constituted with a single IGBT, a large current control capacity needs to be assured in practical use and thus, a plurality of IGBTs are connected in parallel to constitute an upper arm or a lower arm in reality.

The collector electrode of the IGBT constituting the upper arm in a given phase is electrically connected to the positive pole side of the battery 180, whereas the emitter electrode of the IGBT constituting the lower arm in a given phase is electrically connected to the negative pole side of the battery 180. A middle point between the arms corresponding to each phase (an area where the emitter electrode of the upper arm-side IGBT and the collector electrode of the lower arm-side IGBT are connected) is electrically connected to the armature winding (stator winding) of the corresponding phase at the corresponding rotating electrical machine 200 or 202.

The drive circuits 652 and 656, constituting drive units via which the power modules 610 and 620 in the corresponding inverter devices are controlled, generate drive signals used to drive the IGBTs based upon a control signal output from the control circuit 648. The drive signals generated at the individual drive circuits 652 and 656 are respectively output to the gates of the various power semiconductor elements 21 in the corresponding power modules 610 and 620. The drive circuits 652 and 656 are each configured as a block constituted with six integrated circuits that generate drive signals to be provided to the gates of the upper and lower arms corresponding to the various phases.

The control circuit 648, which controls the inverter devices, is constituted with a microcomputer that generates, through arithmetic operation, a control signal (control value) based upon which the plurality of switching power semiconductor elements 21 are engaged in operation (turned on/off). A torque command signal (torque command value) provided from the integrated control device 170, sensor outputs from the current sensors 660 and 662, and sensor outputs from rotation sensors (not shown) mounted at the rotating electrical machines 200 and 202 are input to the control circuit 648. Based upon these signals input thereto, the control circuit 648 calculates control values and outputs control signals to the drive circuits 652 and 656 so as to control the switching timing.

The transmission/reception circuit 644 mounted at the connector substrate 642, which electrically connects the power conversion device 600 with an external control device, is engaged in information exchange with another device via the communication line 174 shown in FIG. 1.

The capacitor module 630, constituting a smoothing circuit via which the extent of DC voltage fluctuation occurring as the power semiconductor elements 21 are engaged in switching operation is reduced, is electrically connected in parallel with DC-side terminals of the power modules 610 and 620.

The structure adopted in the rotating electrical machines 200 and 202 will be described next. Since the structure of the first rotating electrical machine 200 is substantially identical to that of the second rotating electrical machine 202, the following description focuses on the structure adopted in the first rotating electrical machine 200 as a representative example. It is to be noted that the structural features described below do not need to be adopted in both rotating electrical machines 200 and 202, as long as they are adopted in at least one of them.

Figure 3:
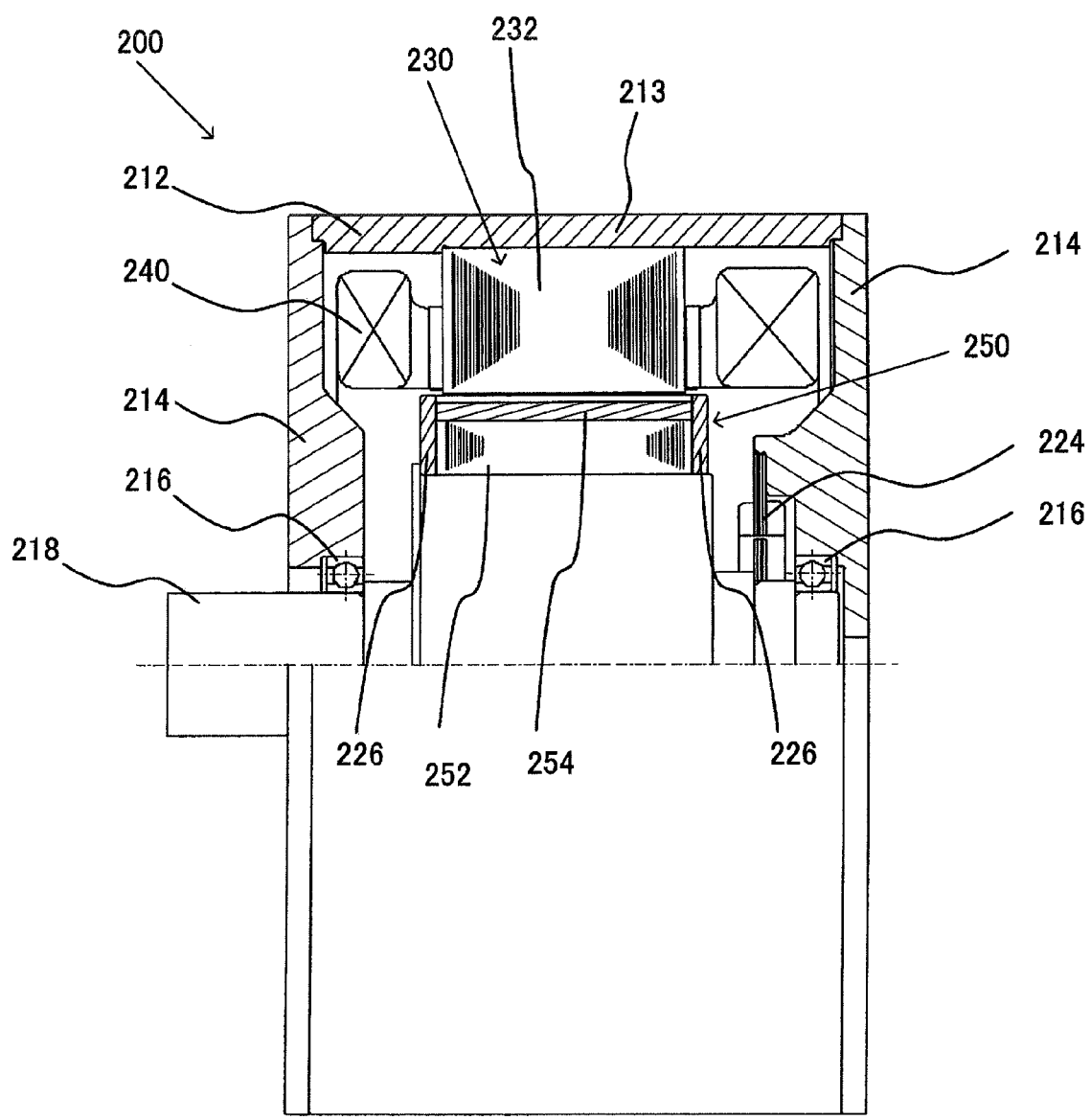
FIG. 3 A partial sectional view of the rotating electrical machine achieved in the first embodiment of the present invention FIG. 4 A perspective providing an external view of a stator core in FIG. 3

FIG. 3 is a partial sectional view of the rotating electrical machine 200. The rotating electrical machine 200 comprises a stator 230 held inside a housing 212 and a rotor 250 rotatably disposed on the inner circumferential side of the stator 230 with a clearance setting it apart from the stator 230. The housing 212 is configured with a pair of end brackets 214 at which bearings 216 are disposed and a center bracket 213 assuming the shape of a circular cylinder.

The rotor 250 includes a rotor core 252, permanent magnets 254 and nonmagnetic contact plates 226. A shaft 218 is attached to the rotor core 252 so as to be allowed to rotate as one with the rotor core 252. The shaft 218 is rotatably held by the bearings 216 disposed at the end brackets 214.

A resolver 224, which detects the positions of the poles at the rotor 250 and the rotation speed of the rotor 250, is disposed at the shaft 218. An output from the resolver 224 is input to the control circuit 648 shown in FIG. 2. The control circuit 648 outputs a control signal, generated based upon the output from the resolver 224, to the drive circuit 652. The drive circuit 652, in turn, outputs a drive signal, generated based upon the control signal, to the power module 610. At the power module 610, switching operation is executed based upon the control signal so as to convert, for instance, DC power, provided from the battery 180, to three-phase AC power, as described earlier. This three-phase AC power is provided to the stator winding 240 shown in FIG. 3 and, as a result, a rotating magnetic field is generated at the stator 230. The frequency of the three-phase AC currents is controlled based upon an output value provided by the resolver 224 and the phases of the three-phase AC currents relative to the rotor 250, are also controlled based upon the output value provided by the resolver 224.

Rectangular permanent magnets 254 are disposed over equal intervals along the circumferential direction near the outer circumference of the rotor core 252. The permanent magnets 254 function as field poles of the rotor 250 and the rotor in the embodiment assumes a 12-pole structure. As a rotating magnetic field is generated at the stator 230 by the three-phase AC currents flowing through the stator winding 240, torque is generated with the rotating magnetic field acting on the permanent magnets 254 at the rotor 250.

Figure 4:
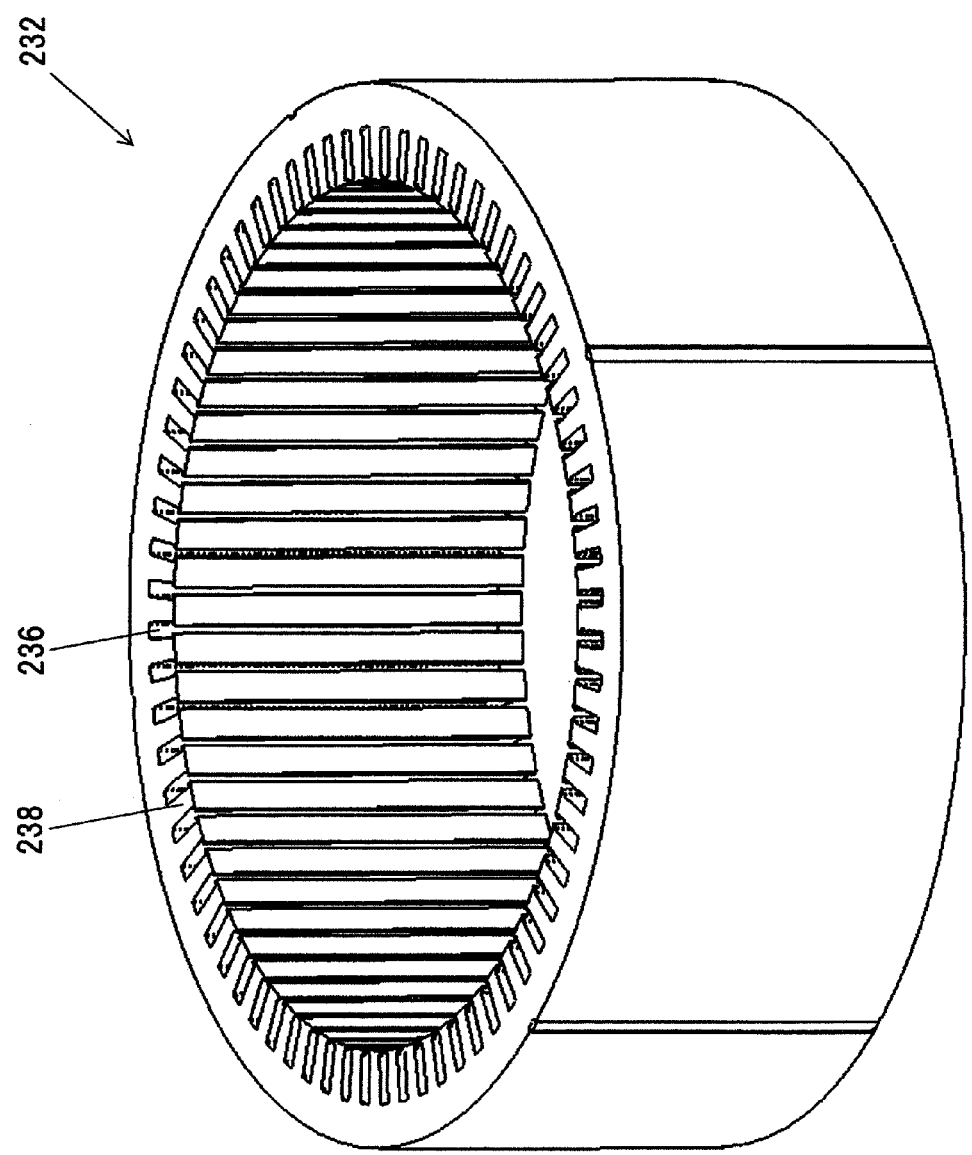
Figure 5:
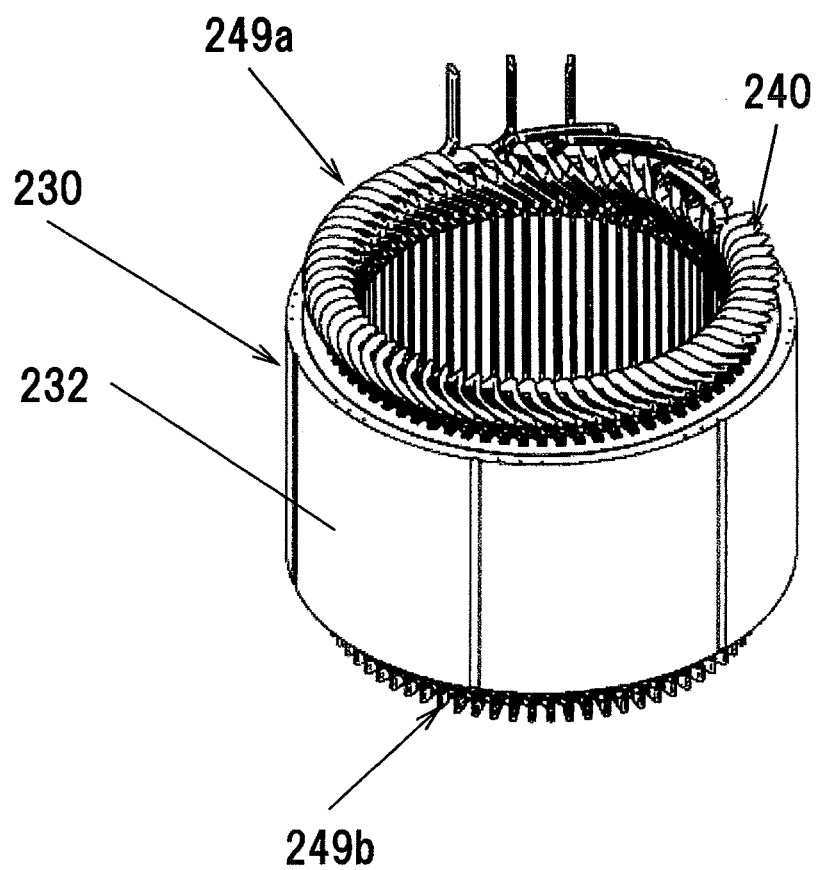
FIG. 5 A perspective providing an external view of a stator in FIG. 3

The stator 230 will be described in reference to FIGS. 3 through 5. FIG. 4 presents an external view of the stator core 232 in a perspective and FIG. 5 is a perspective presenting an external view of the stator 230. The stator 230 includes the stator core 232 assuming the shape of a circular cylinder (see FIGS. 3 through 5) and the stator winding 240 (see FIG. 3 and FIG. 5) installed at the stator core 232.

The stator core 232 is formed by laminating a plurality of ring-shaped electrical steel sheets with a small thickness. The thickness of the electrical steel sheets used to form the stator core 232 should be approximately 0.05 to 1.0 mm and such electrical steel sheets may be formed through stamping or through etching.

As shown in FIG. 4, a plurality of slots 236 and a plurality of teeth 238, ranging parallel to the axis of the stator core 232, are formed on the inner circumferential side of the stator core 232 over equal intervals along the circumferential direction. In the embodiment, 72 slots 236 are formed and a plurality of phase windings, corresponding to the U phase, the V phase and the W phase, which constitute the stator winding 240, are wound through the various slots 236, as shown in FIG. 5.

Figure 6:
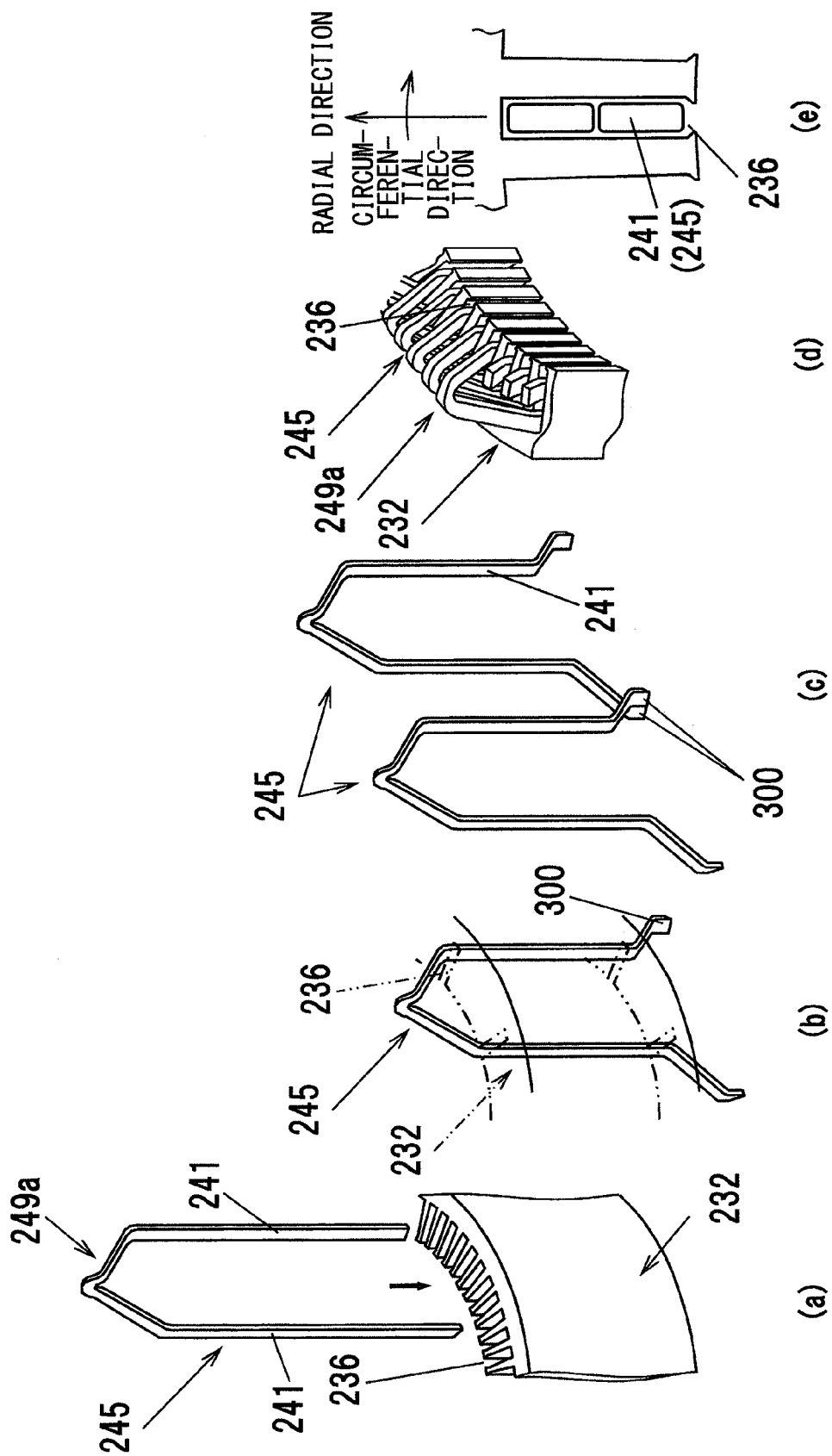
FIG. 6 Schematic illustrations of a process through which conductor segments are mounted at the stator core FIG. 7 A schematic illustration indicating the positions assumed by conductor segments inserted through slots at the stator core FIG. 8 A graph indicating the relationship between the thermal conductivity and the electrical conductivity FIG. 9 A graph indicating the relationship between the electrical conductivity and the strength FIG. 10 A graph indicating the relationship between the strain and the strength FIG. 11 A chart of manufacturing steps through which the stator in the rotating electrical machine achieved in the first embodiment of the present invention is manufactured FIG. 12 Schematic illustrations of the conductor segment alignment step, the plastic deformation step and the welding step FIG. 13 (a) presenting a sectional view of the weld metal formed at the end portions of conductor segments achieved in the embodiment and (b) presenting a sectional view of the weld metal formed at the end portions of conductor segments in a comparison example FIG. 14 A diagram indicating the relationship between the forming rate and the blowhole volume ratio FIG. 15 (a) presenting a schematic external view of the weld metal formed at the end portions of a conductor segment and (b) presenting a schematic external view of the weld metal formed at the end portions of a conductor segment achieved in the comparison example FIG. 16 A diagram indicating the relationship between the dimensional ratio at the plastically deformed areas and the sectional area ratio at the weld metal FIG. 17 A chart of manufacturing steps through which the stator in the rotating electrical machine achieved in a second embodiment of the present invention is manufactured FIG. 18 Schematic illustrations of the conductor segment alignment step, the plastic deformation step and the welding step
Figure 7:
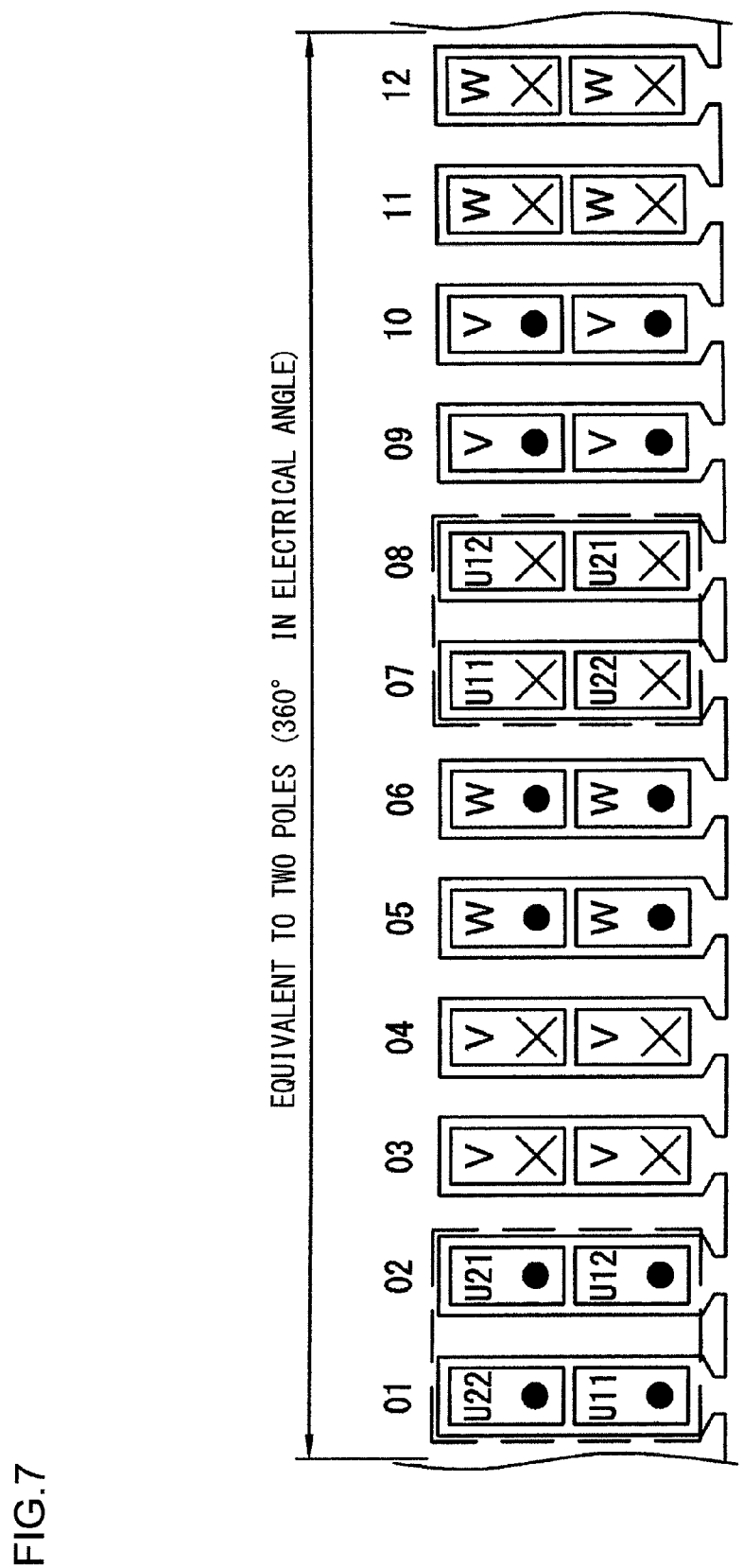

FIG. 6 schematically illustrates the process through which conductor segments (segmented coils) 245 are mounted at the stator core 232. FIG. 7 is a schematic illustration in reference to which the positions taken up by conductor segments 245 inserted through the slots 236 in the stator core 232 will be explained. In the embodiment, twelve slots 236 are formed over a range of 360° in electric angle, and the slots assigned with slot numbers 01 through 12 in FIG. 7, for instance, correspond to two poles. In other words, the number of slots accounting for each single pole is six and the number of slots NSPP accounting for a given phase of a pole is two (=6/3). Two conductor segments 245 in the stator winding 240 are inserted at each slot 236. Either a cross mark "x" indicating the direction of an electric current flowing from one coil end toward the opposite coil end or a filled circle mark "●" indicating the reverse direction is entered in each rectangular frame.

The stator winding 240 is formed by welding end portions 300 of the plurality of conductor segments 245 formed so as to achieve a substantially U-shape. The base material used to constitute the conductor segments 245 is a tough pitch copper wire. The conductor segments 245 each include coil sides 241, which are linear portions placed inside the slots 236 in the stator 230, and coil ends 249a and 249b (see FIG. 5) set so as to project out of slots 236 through the two ends of the stator core 232.

As shown in FIG. 6(a) and FIG. 7, the coil end 249a of a conductor segment 245 is formed by bending the material so that one of the two coil sides 241 of the conductor segment 245 can be inserted through a specific slot 236 on the inner side along the radial direction at the stator 230 and that the other coil side 241 can be inserted through another slot 236 on the outer side along the radial direction.

As shown in FIG. 6(a), conductor segments 245 are inserted through 24 slots 236 allocated to the U-phase from one end surface side (from the side where the coil ends 249a are located in FIG. 5) of the stator core 232. A given conductor segment 245 is inserted over an interval that corresponds to a predetermined number of slots.

As FIG. 7 shows, the slot 236, through which one of the two coil sides 241 belonging to a given conductor segment 245 is inserted, and the slot 236 through which the other coil side 241 belonging to the same conductor segment 245 is inserted, are set apart from each other by a pitch of six in the embodiment.

The end portions 300 of the conductor segments 245 inserted through slots 236 project out beyond the other end surface (located on the side where the coil ends 249b are present in FIG. 5) of the stator core 232, as shown in FIG. 6(b). As FIG. 6(b) illustrates, the linear portions of the conductor segments 245 located on the side where the end portions 300 are to be formed are bent in an alternating pattern. The conductor segments 245 are positioned so that an end portion 300 belonging to a U-phase conductor segment 245 is set next to an end portion 300 belonging to another U-phase conductor segment 245, and the end portions 300 set adjacent to each other are then welded together, as illustrated in FIG. 6(c). Through this process, that U-phase stator winding 240 is wound at the stator core 232. The V-phase stator winding 240 and the W-phase stator winding 240 are likewise wound at the stator core 232, and as a result, the U-phase stator winding 240, the V-phase stator winding 240 and the W-phase stator winding 240 are all wound at the stator core 232 as shown in FIG. 6(d).

The conductor segments 245 are manufactured by using a flat wire with the conductor section of which assuming a rectangular shape. The flat wire is shielded with an insulating film (not shown in FIG. 6). As FIG. 6(e) illustrates, the flat wire is disposed in the slots 236 so that the shorter sides of the rectangular sections of the conductor segments 245 in each slot 236 run along the circumference of the stator 230 (hereafter may be described simply as "along the circumferential direction") and that the longer sides of the rectangular sections of the conductor segments 245 run along the radius of the stator 230 (hereafter may be described simply as "along the radial direction"). The dimensions of such a flat wire may be approximately 1.5 to 3.0 mm measured along the circumferential direction and 2.5 to 6.5 mm measured along the radial direction. The dimensions of the flat wire used in the embodiment are 1.6 mm measured along the circumferential direction and 6.4 mm measured along the radial direction. The use of flat wire instead of round wire makes it possible to improve the space factor with which the conductor segments 245 are housed inside the slots 236 and as a result, the rotating electrical machine 200 achieves higher output.

In the embodiment, two conductor segments 245 are inserted through each slot 236, as illustrated in FIG. 6(e). The end portions 300 of the conductor segments 245 are bonded to each other through TIG welding or plasma arc welding. However, water vapor may be generated with hydrogen from the atmosphere and oxygen in the base material during the welding process if the oxygen content in the conductor segments 245 is high, and in such a case, large blowholes may be formed in the weld metal.

The formation of blowholes in the weld metal can be effectively suppressed by allowing the weld metal to solidify over a greater length of time so as to allow the water vapor generated during the welding process to be more thoroughly released to the outside. In the embodiment, the length of time over which the weld metal solidifies is increased by plastically deforming the end portions 300 of the conductor segments 245 prior to the welding process and thus lowering the thermal conductivity.

Figure 8:
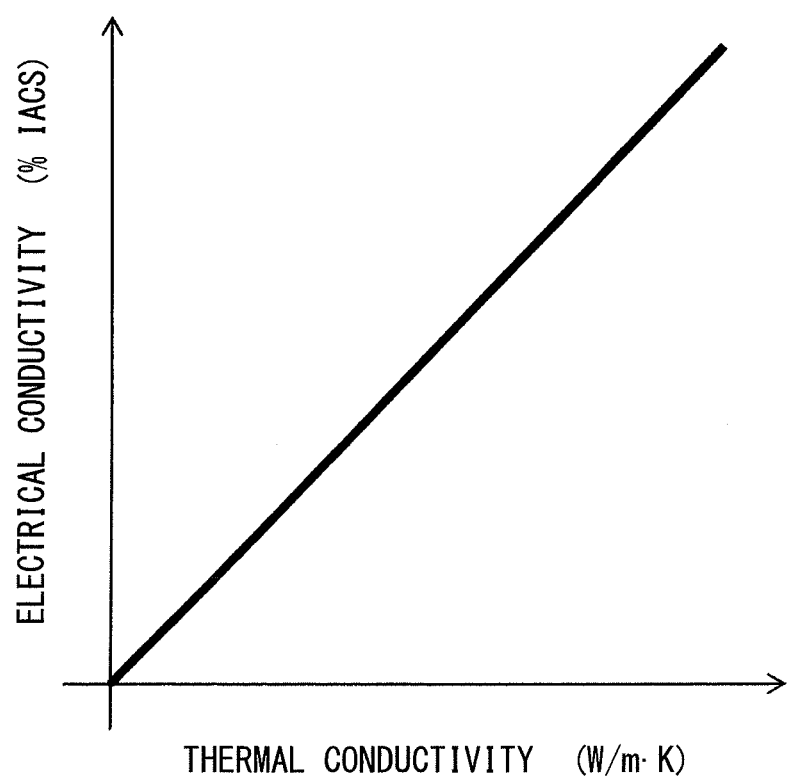
Figure 9:
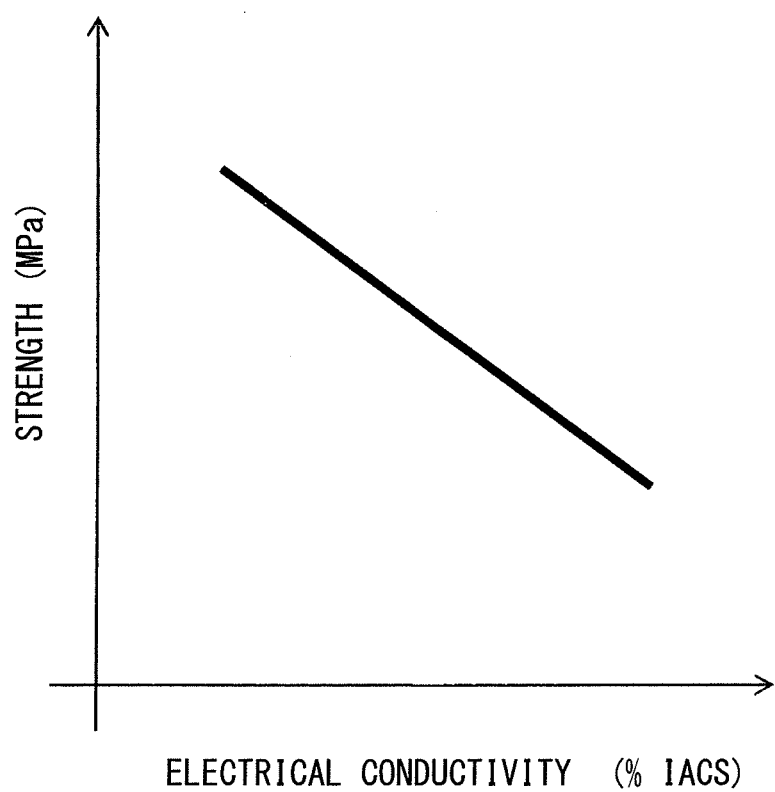
Figure 10:
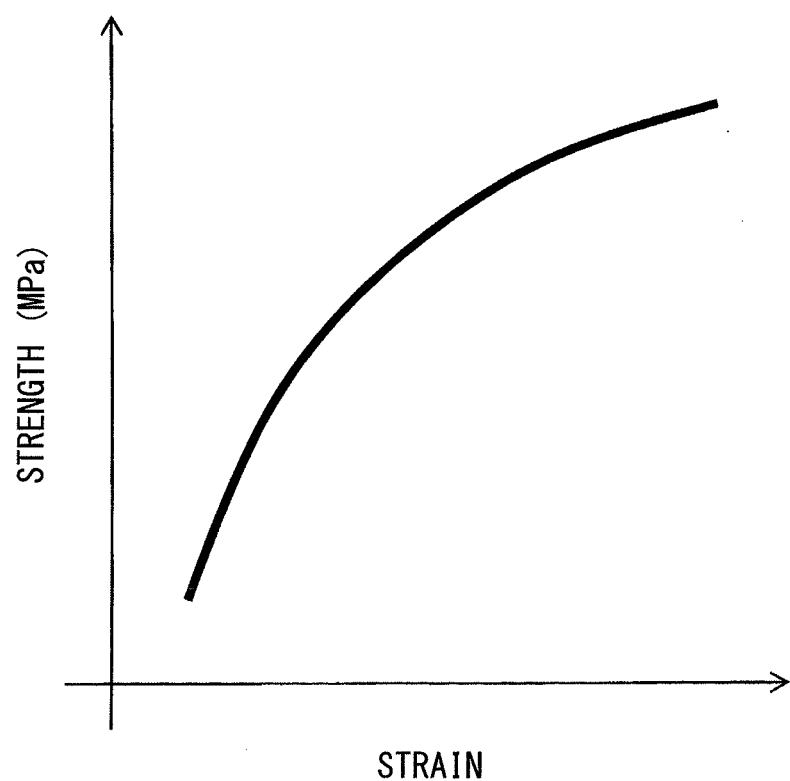

FIG. 8 is a graph indicating the relationship between the thermal conductivity and the electrical conductivity, whereas FIG. 9 is a graph indicating the relationship between the electrical conductivity and the strength. FIG. 10 is a graph indicating the relationship between the strain and the strength. As FIG. 8 indicates, the thermal conductivity and the electrical conductivity have a proportional relationship to each other whereby (A) as the thermal conductivity becomes lower, electrical conductivity also becomes lower. As FIG. 9 indicates, the electrical conductivity and the strength have a proportional relationship to each other whereby (B) as the electrical conductivity becomes lower, the strength increases. As FIG. 10 indicates, the strain and the strength assume a relationship whereby (C) as the strain increases, the strength becomes greater. The relationships (A), (B) and (C) described above lead to a conclusion that "as the strain increases, the thermal conductivity becomes lower".

In the embodiment, the end portions 300 of the conductor segments 245 are plastically deformed prior to the welding process. The thermal conductivity of the plastically deformed portions is lower than the thermal conductivity at the end portions prior to the plastic deformation. Thus, as the plastically deformed portions undergo the welding process, the weld metal takes longer to solidify compared to the length of time it would take for weld metal to solidify if the end portions were welded together without first being plastically deformed. As a result, since the water vapor generated during the welding process is more fully released into the atmosphere, the formation of blowholes in the weld metal is reduced through the embodiment, compared to the extent of blowhole formation occurring in the weld metal if the end portions were not first plastically deformed.

Figure 11:
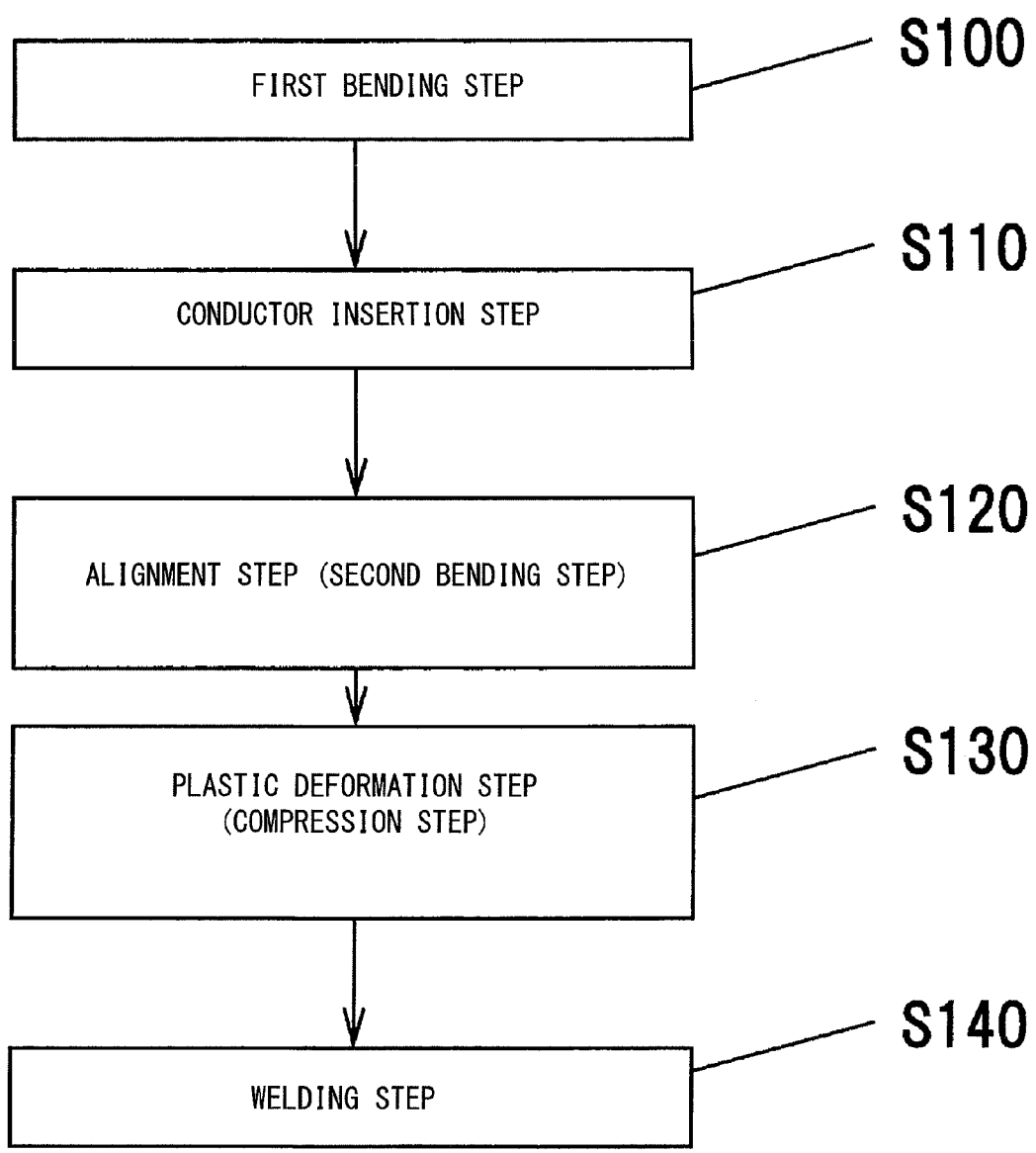
Figure 12:
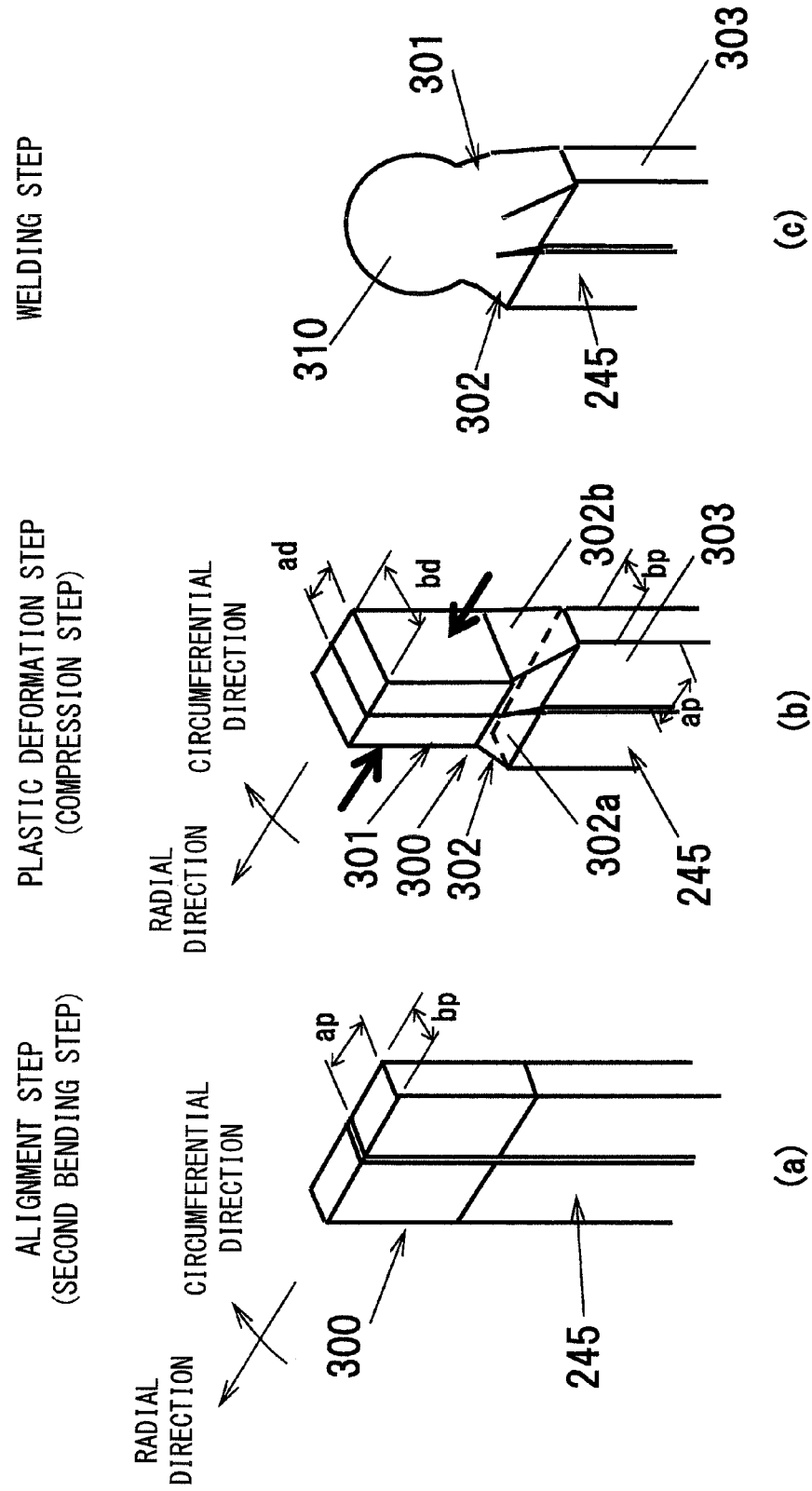

The manufacturing method adopted when manufacturing the rotating electrical machine 200 achieved in the first embodiment of the present invention will be described next. FIG. 11 presents a chart of manufacturing steps through which the stator 230 in the rotating electrical machine 200 achieved in the first embodiment of the present invention is manufactured. FIG. 12 presents schematic illustrations of the aligning step through which conductor segments 245 are aligned, the plastic deformation step and the welding step, in views taken from the side on which the coil ends 249b are present in FIG. 5.

—First Bending Step—

In a first bending step S100, each conductor segment 245, with an insulating film 303a at the two end portions thereof having been removed over a predetermined range, is bent into a substantially U-shape, as shown in FIG. 6(a). The range over which the insulating film 303a is removed at each end area does not include an undeformed portion 303, which will be described in detail later, i.e., the insulating film 303a is removed over a range corresponding to a plastically deformed portion 301 and a tapered portion 302 (see FIG. 12(b)). It is to be noted that the insulating film 303a may be removed after the conductor segment 245 is bent into a substantially U-shape instead.

—Conductor Insertion Step—

In a conductor insertion step S110, the conductor segment 245 is inserted through slots 236 from one end surface of the stator core 232 (from the side where the coil ends 249a are located in FIG. 5) so that the end portions 300 of the conductor segment 245 project out beyond the other end surface of the stator core 232 (on the side where the coil ends 249b are located in FIG. 5).

—Alignment Step (Second Bending Step)—

In an alignment step (second bending step) S120, the conductor segment 245 is inserted through slots 236, then the areas of the linear portions thereof projecting out beyond the other end surface of the stator core 232 (on the side where the coil ends 249b are located in FIG. 5) are each bent toward the adjacent conductor segment 245, to which the portion is to be connected, as shown in FIG. 6(b), the sides of the bent portions where the tips are located are further bent downward in the figure, and finally the conductor segments 245 are aligned so as to position an end portion 300 belonging to a given conductor segment 245 adjacent to the corresponding end portion 300 of the adjoining conductor segment 245, as shown in FIG. 6(c) and FIG. 12(a).

—Plastic Deformation Step (Compression Step)—

In a plastic deformation step (compression step) S130, pressure is applied to the pair of end portions 300 abutted to each other so as to hold the two end portions 300 together from the two outer sides facing opposite each other along the radial direction of the stator 230, i.e., so as to compress the end portions 300 along the radial direction, thereby forming plastically deformed portions 301, as shown in FIG. 12(b). Concurrently with the formation of the plastically deformed portions 301, a tapered portion 302 is formed between the plastically deformed portions 301 and undeformed portions 303.

Through the forming process, the plastically deformed portions 301 are each formed into the shape of a rectangular column assuming a dimension bd, measured along the circumferential direction, which is greater than a dimension by measured at an undeformed portion 303 along the circumferential direction and a dimension ad, measured along the radial direction, which is smaller than a dimension ap measured at the undeformed portion 303 along the radial direction.

The tapered portion 302 includes four tapered surfaces. A pair of tapered surfaces 302a facing opposite each other along the circumferential direction of the stator 230, each take on a dimension measured along the radial direction, which gradually becomes smaller as the tapered surface 302a ranges from the side where the undeformed portions 303 are present toward the plastically deformed portions 301. A pair of tapered surfaces 302b facing opposite each other along the radial direction of the stator 230, each take on a dimension measured along the circumferential direction, which gradually becomes greater as the tapered surface 302b ranges from the side where the undeformed portions 303 are present toward the plastically deformed portions 301.

The pair of plastically deformed portions 301, achieved by compressing the end portions from the two outer sides facing opposite each other along the radial direction, are offset toward the contact surfaces where the end portions 300 contact each other relative to the corresponding undeformed portions 303.

—Welding Step—

In a welding step S140, the conductor segments 245 are welded together at the tops of their plastically deformed portions 301 through TIG welding or plasma arc welding, as shown in FIG. 12(c). A semi-spherical weld metal 310 is formed over the tops of the plastically deformed portions 301.

The stator winding 240 is installed at the stator core 232 by welding a plurality of conductor segments 245, which completes the manufacturing process of the stator 230.

—Assembly Step—

The stator 230, manufactured by installing the stator winding 240 at the stator core 232, is locked to the center bracket 213 through shrink-fitting or press-fitting. One of the end brackets 214 is attached to the center bracket 213 so that the shaft 218 of the rotor 250 is mounted at the bearing 216 of the particular end bracket 214 and so that the rotor 250 is positioned further inward relative to the stator 230. As the shaft 218 of the rotor 250 is mounted at the bearing 216 of the other end bracket 214 and this end bracket 214 is attached to the center bracket 213, the assembly of the rotating electrical machine 200 is completed.

The following advantages are achieved through the first embodiment described above.

(1) Plastically deformed portions 301 are formed at the end portions 300 of each conductor segment 245 and a tapered portion 302 is formed between the undeformed portion 303 and the plastically deformed portion 301. The plastically deformed portion 301 is formed so as to take on a dimension bd measured along the circumferential direction, which is greater than the dimension by measured at the undeformed portion 303 along the circumferential direction, and a dimension ad measured along the radial direction, which is smaller than the dimension ap measured at the undeformed portion 303 along the radial direction. The thermal conductivity at the plastically deformed portion 301 is lowered by plastically deforming the end portion 300 of the conductor segment 245. This means that when the plastically deformed portions 301 are welded together at the tops thereof, the weld metal 310 takes longer to set or solidify, and during this prolonged setting period, the water vapor having been generated through the welding process can be fully released to the outside so as to reduce blowholes formed inside the weld metal 310.

Figure 13:
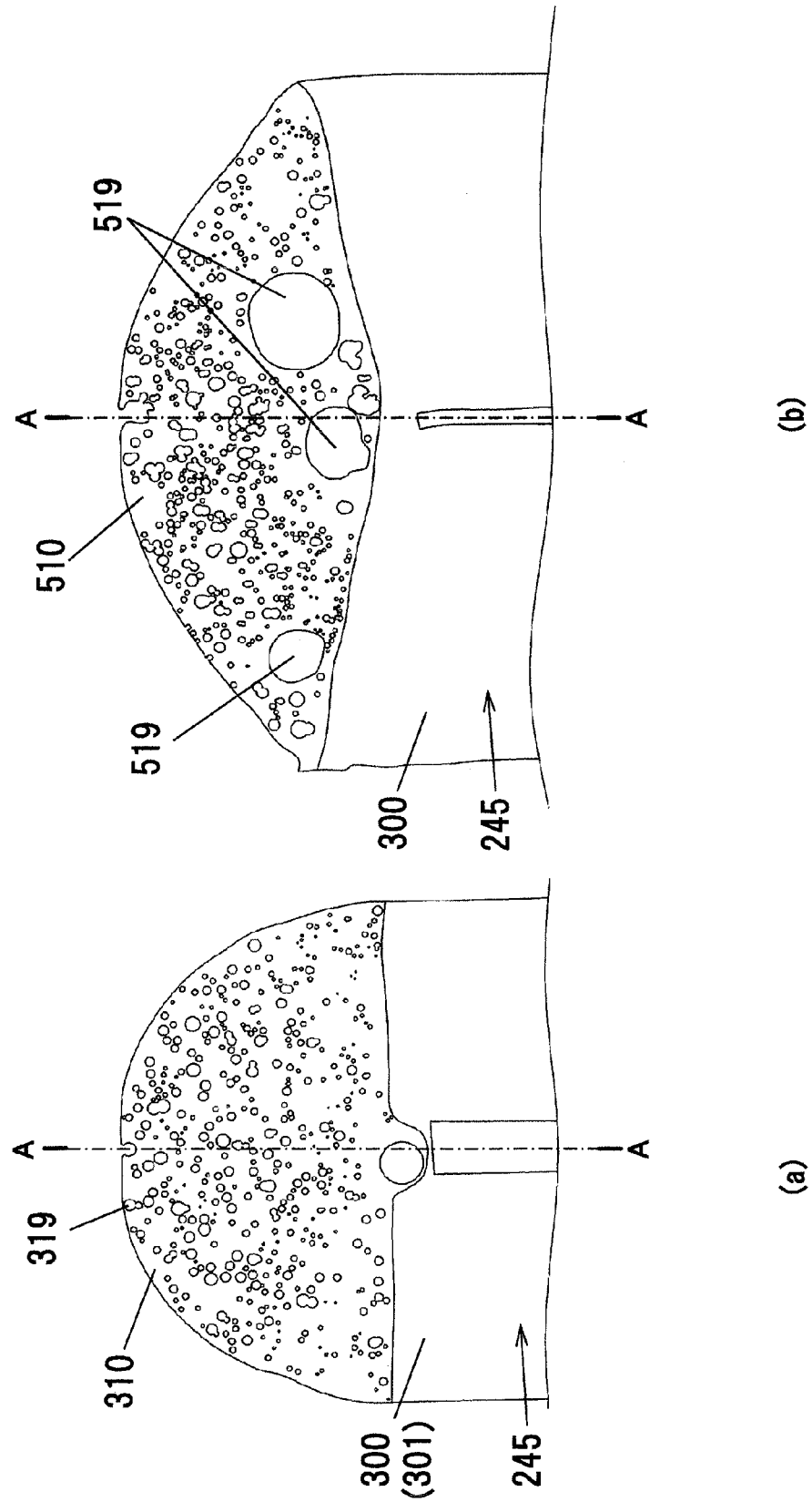

FIG. 13(a) is a sectional view taken along the radial direction through the weld metal 310 formed at the end portions 300 of the conductor segments 245 achieved in the embodiment. FIG. 13(b) is a sectional view taken along the radial direction through a weld metal 510 formed at end portions 300 of conductor segments 245 in a comparison example, which are welded together without first going through a plastic deformation step. In the comparison example, large blowholes 519 are formed, as shown in FIG. 13(b). The embodiment is distinguishable in that while small blowholes 319 are formed, large blowholes 519, such as those formed in the comparison example, are not present.

Figure 14:
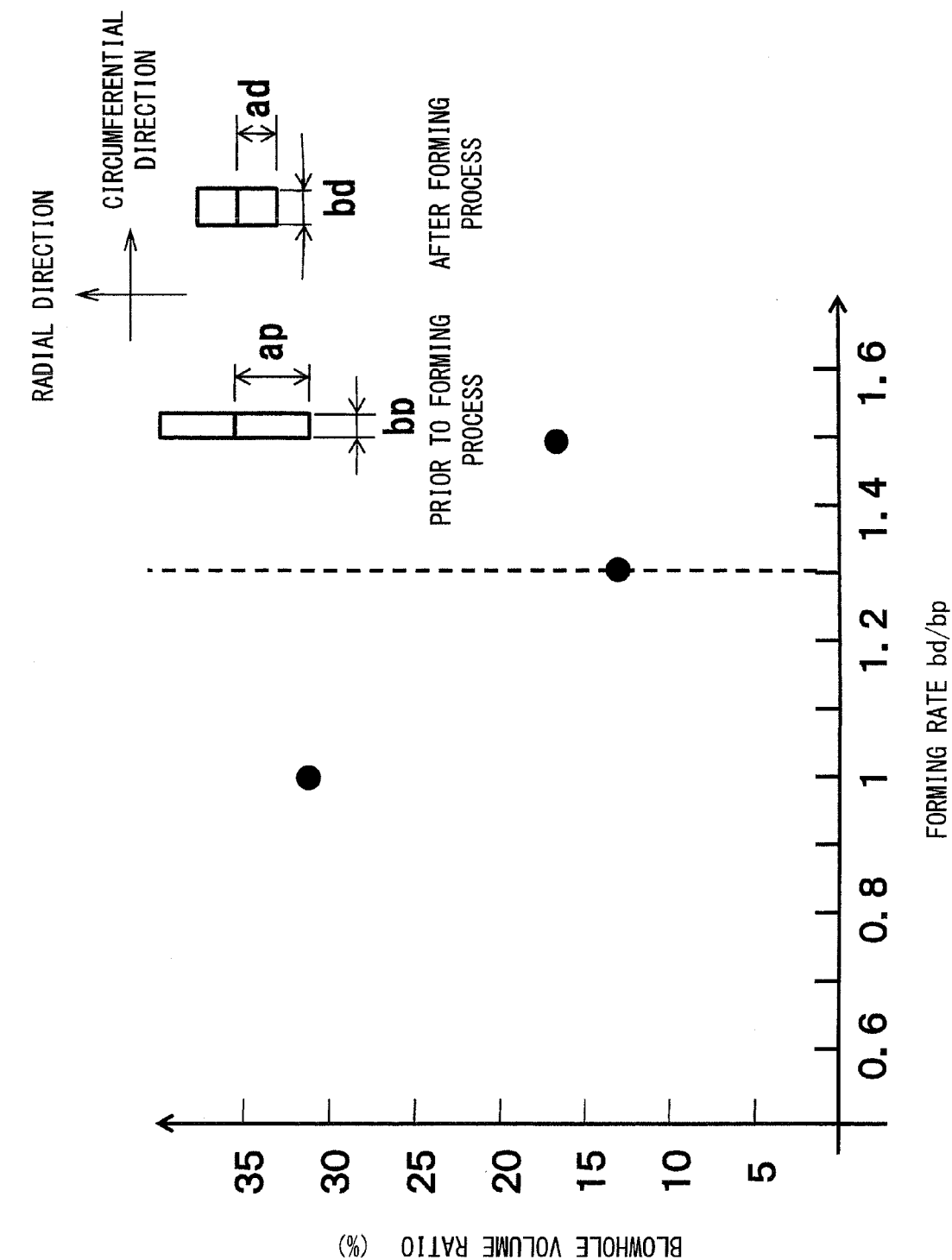

FIG. 14 is a diagram indicating the relationship between the forming rate of the plastic deformation at the end portions 300 and the volume ratio of blowholes 319. The graph presented in FIG. 14 was created by forming plastically deformed portions at the end portions 300 of the conductor segments 245 with varying forming rates and measuring the corresponding volume ratios of blowholes 319 formed within the weld metal 310. In FIG. 14, the ratio of the dimension of the end portion 300 having undergone the forming process, measured along the circumferential direction, i.e., the dimension bd measured at the plastically deformed portion 301 along the circumferential direction, to the dimension of the end portion 300 measured along the circumferential direction before undergoing the forming process, i.e., the dimension by measured at the undeformed portion 303 along the circumferential direction, is designated as the forming rate and indicated along the horizontal axis. The blowhole volume ratio is indicated along the vertical axis. When the forming rate bd/bp=1.3, the volume ratio of blowholes 319 is approximately 13%, whereas the volume ratio of blowholes 319 measured when the forming rate bd/bp=1.0 is approximately 32%. Namely, the volume ratio of blowholes 319 corresponding to the forming rate bd/bp=1.3 is approximately 40% of the volume ratio measured in correspondence to the forming rate bd/bp=1.0. It is to be noted that when the forming rate bd/bp=1.5, the volume ratio of blowholes 319 is approximately 17%, and thus, desirable results are achieved.

These test results indicate that when the forming rates bd/bp, i.e., the ratio of bd representing the dimension of the plastically deformed portion 301 measured along the circumferential direction (the dimension of the end portion 300 measured along the circumferential direction after the forming process) to by representing the dimension of the undeformed portion 303 measured along the circumferential direction (the dimension of the end portion 300 measured along the circumferential direction before the forming process), is equal to or greater than 1.3, formation of blowholes 319 can be greatly reduced. Through the embodiment, the presence of blowholes 319 is reduced and as a result, the bond strength between the conductor segments 245 is improved.

In the embodiment, by plastically deforming the end portions 300 of the conductor segments 245 so as to increase the dimension bd thereof measured along the circumferential direction following the forming process relative to the dimension by thereof measured along the circumferential direction prior to the forming process, significant plastic deformation is allowed to occur at the end portions 300 so as to effectively lower the thermal conductivity while, at the same time, minimizing the extent to which the area of the end surface (bd×2 ad) formed by the pair of plastically deformed portions 301, viewed from the central axis of the stator 230, defining the welding range, becomes reduced.

In contrast, the end portions are formed in the technology disclosed in patent literature 1 so as to result in a smaller welding range at the end surface formed with the end portions, and the forming process in patent literature 1 does not increase the dimension of the end portions measured along the circumferential direction, either. For this reason, the weld metal formed through the art disclosed in patent literature 1 may not achieve a sufficient sectional area along the circumferential direction, which would make it difficult to improve the bond strength between the conductor segments 245.

(2) An oxygen-free copper (OFC) wire with a low oxygen content (with an oxygen content of 10 ppm or less) may be used as the base material to constitute the conductor segments 245, in order to suppress the formation of blowholes. However, such an oxygen-free copper wire is manufactured through a greater number of manufacturing steps compared to a standard tough pitch copper (TPC) wire and is thus bound to be more expensive. In the embodiment, the formation of blowholes 319 can be reduced by plastically deforming the end portions 300 of the conductor segments 245 constituted with a tough pitch copper wire, without requiring the use of a costly oxygen-free copper wire. As a result, the rotating electrical machine 200 can be provided at lower cost.

(3) The plastically deformed portion 301 is formed so that its dimension bd, measured along the circumferential direction, is greater than the dimension of the end portion 300 measured along the circumferential direction prior to the forming process, i.e., greater than the dimension by of the undeformed portion 303 measured along the circumferential direction, and so that the dimension ad of the plastically deformed portion 301 measured along the radial direction is smaller than the dimension of the end portion 300 measured along the radial direction prior to the forming process, i.e., smaller than the dimension ap of the undeformed portion 303 measured along the radial direction. Through these measures, the entire section formed with the pair of plastically deformed portions 301, viewed from the central axis of the stator 230, is allowed to take on a shape closely approximating that of a square when the stator winding 240 is installed at the stator core 232 by setting the longer sides of the flat wire along the radius of the stator 230 and setting the shorter sides of the flat wire along the circumference of the stator 230. By adjusting the shape of the end surface formed with the end portions 300 of the two conductors to be welded together into a shape approximating a square, uniformity is achieved in the surface tension at the molten metal (molten pool). As a result, a semi-spherical weld metal 310 can be formed, and thus, the weld metal 310, sliced along the circumferential direction, i.e., along line A-A in FIG. 13, achieves a large sectional area. This means that sufficient bond strength is assured.

Figure 15:
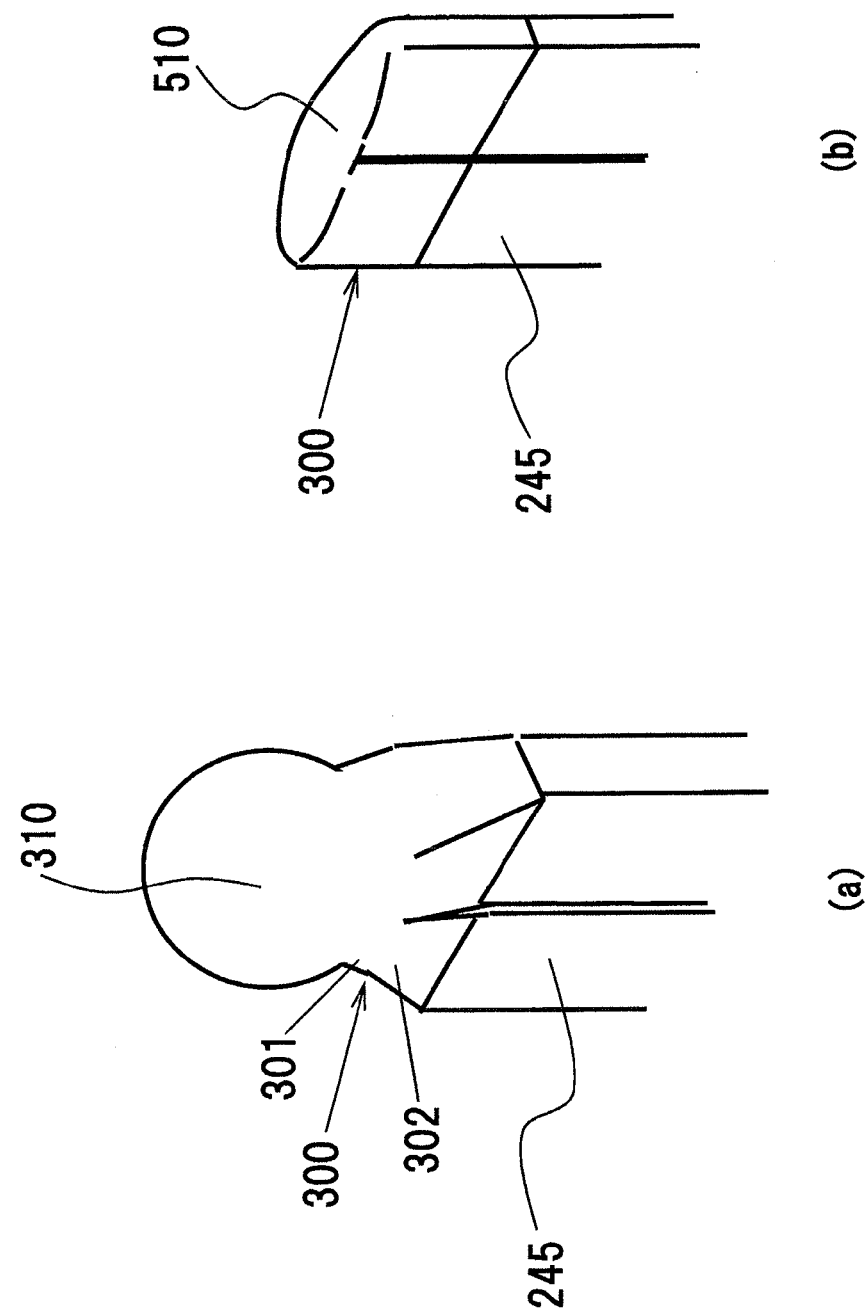

FIG. 15(a) is a schematic illustration of an external view of the weld metal 310 formed at the end portions 300 of the conductor segments 245 in the embodiment, whereas FIG. 15(b) is a schematic illustration of an external view of a weld metal 510 formed at the end portions 300 of the conductor segments 245 in the comparison example, welded together without first undergoing a plastic deformation step. As FIG. 15(b) shows, the end surface formed by the end portions 300, which defines the welding range, has a narrow rectangular shape. At such an end surface, the molten metal (molten pool) is pulled toward the two outer sides facing opposite each other along the radial direction due to surface tension and, as a result, a flat weld metal 510 is formed. In contrast, a semi-spherical weld metal 310 is formed in the embodiment.

Figure 16:
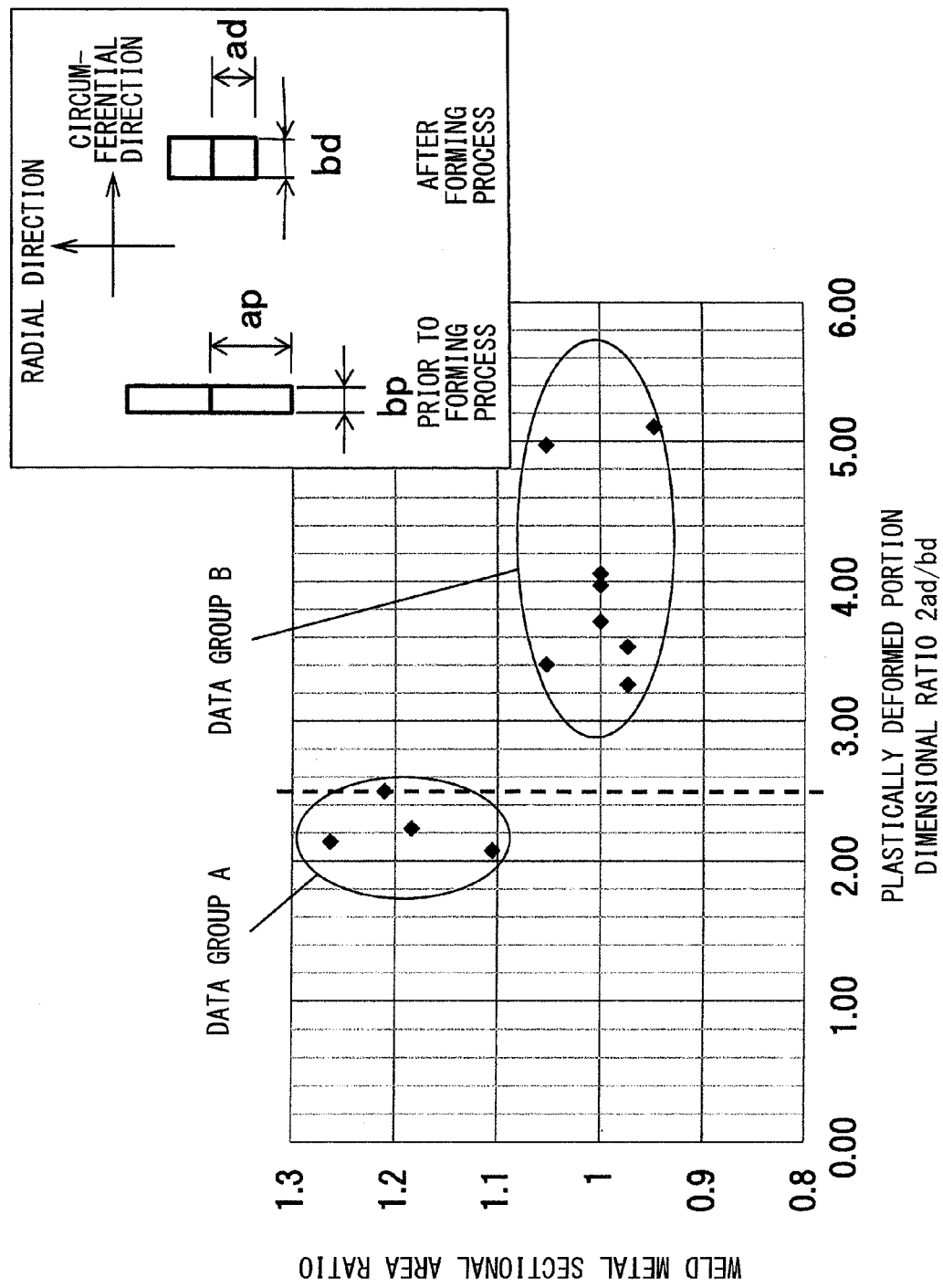

FIG. 16 is a chart indicating the relationship between the dimensional ratio at the plastically deformed portions and the sectional area ratio at the weld metal. In FIG. 16, the ratio 2ad/bd of the total dimension 2ad of the pair of plastically deformed portions measured along the radial direction to the dimension bd measured along the circumferential direction is indicated along the horizontal axis. A weld metal sectional area ratio calculated by non-dimensionalizing a measured sectional area taken through the weld metal 310 along the circumferential direction with a predetermined sectional area, is indicated along the vertical axis. The graph presented in FIG. 16 was obtained by forming the plastically deformed portions at the end portions 300 of the conductor segments 245 with varying extents of plastic strain and measuring the sectional area of the weld metal 310.

As FIG. 16 indicates, when the plastically deformed portion dimensional ratio 2ad/bd=2.5, for instance, a weld metal sectional area ratio of approximately 1.2 is achieved, which means that the bonding area increases by approximately 20% compared to the bonding area achieved in correspondence to the weld metal sectional area ratio of approximately 1.0 calculated when the plastically deformed portion dimensional ratio 2ad/bd=4.0. The plurality of sets of test data can be sorted into a data group A with relatively high weld metal sectional area ratios and a data group B with relatively low weld metal sectional area ratios.

These test results indicate that when the plastically deformed portion dimensional ratio 2ad/bd, with ad representing the dimension of the plastically deformed portion 301 measured along the radial direction and bd representing the dimension of the plastically deformed portion 301 measured along the circumferential direction, is equal to or less than 2.5, a greater bonding area can be achieved compared to the bonding area for the weld metals in data group B. Through the embodiment in which the shape of the end surface formed with the end portions 300 of the two conductors to be welded together is adjusted so as to approximate the shape of a square by increasing the dimension of the conductor segments 245 measured along the circumferential direction, the sectional area of the weld metal 310 sliced along the circumferential direction, i.e., along line A-A in FIG. 13, can be increased, which, in turn, makes it possible to improve the bond strength between the conductor segments 245 and reduce the electrical resistance.

In contrast, as explained earlier, the end portions are formed in the technology disclosed in patent literature 1 so as to result in a smaller welding range at the end surface formed with the end portions and the dimension of the end portions, measured along the circumferential direction, does not increase through the forming process either. For this reason, the weld metal formed through the art disclosed in patent literature 1 may not achieve a sufficient sectional area for the weld metal along the circumferential direction, which would make it difficult to improve the bond strength between the conductor segments 245.

Second Embodiment

Figure 17:
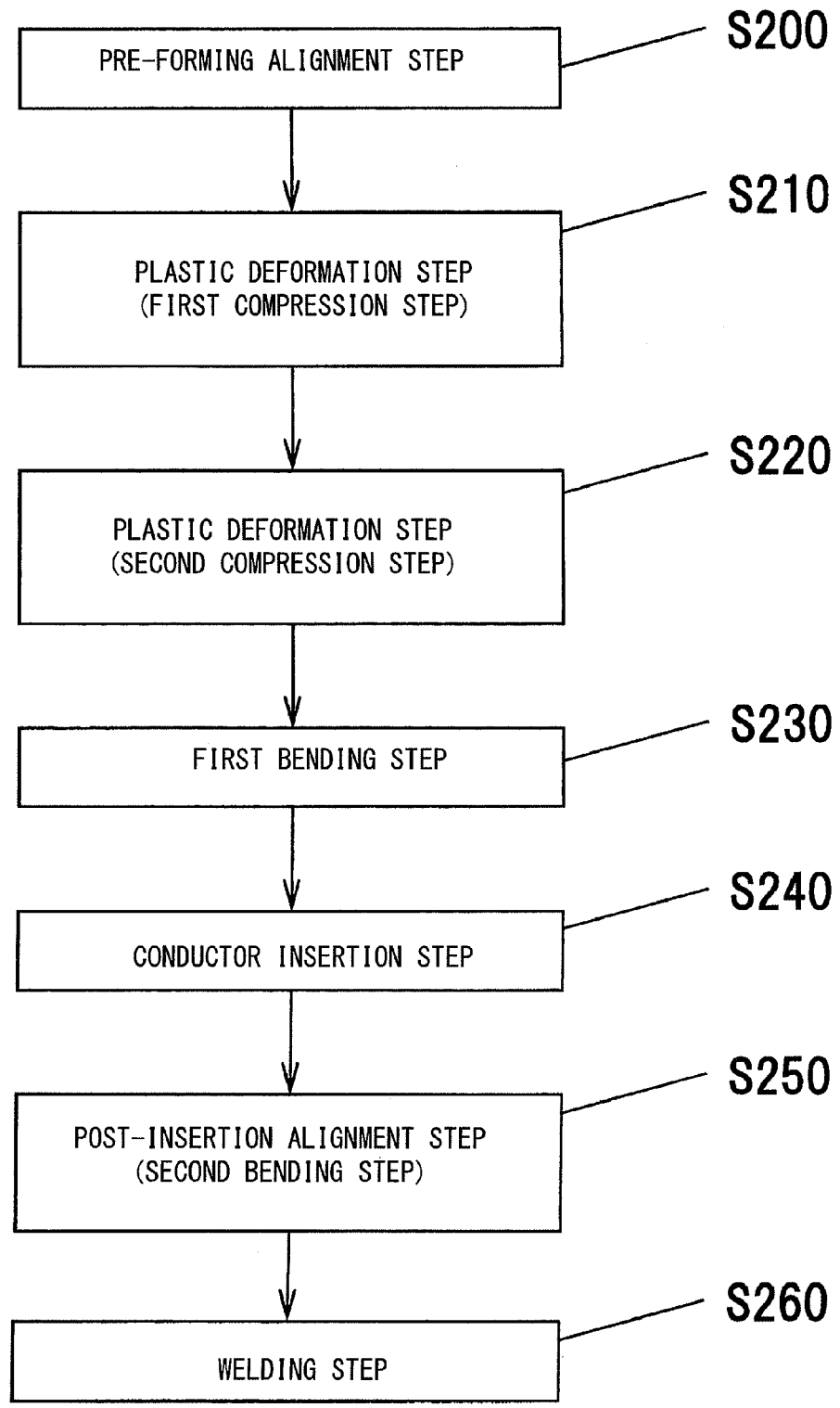
Figure 18:
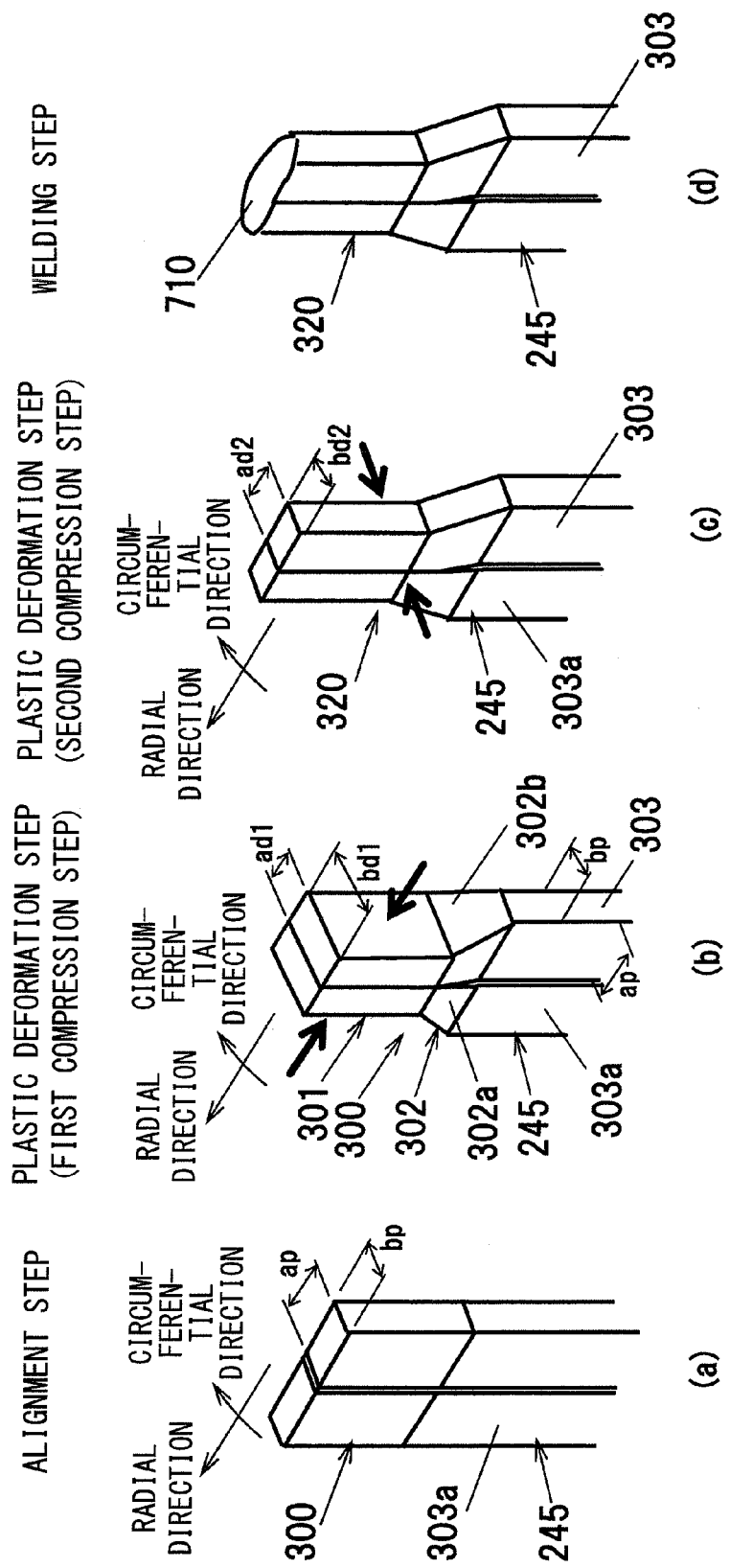

The second embodiment of the present invention will be described in reference to FIG. 17 and FIG. 18. FIG. 17 presents a chart of manufacturing steps through which the stator 230 in the rotating electrical machine 200 achieved in the second embodiment of the present invention is manufactured. FIG. 18 presents schematic illustrations of the aligning step through which conductor segments 245 are aligned, the plastic deformation step and the welding step. It is to be noted that in the figures, the same reference numerals are assigned to elements identical to or equivalent to those in the first embodiment so as to preclude the necessity for a repeated explanation thereof.

In the second embodiment, the end portions 300 of the conductor segments 245 are plastically deformed before the conductor segments 245 are inserted through the slots 236 at the stator core 232.

The following is a description of the manufacturing method adopted when manufacturing the rotating electrical machine 200 achieved in the second embodiment of the present invention.

—Pre-Forming Alignment Step—

In a pre-forming alignment step S200, the insulating film 303a is removed over a predetermined range at the two ends of each conductor segment 245 that stretches straight, and conductor segments 245 are aligned so as to set an end portion 300 of a conductor segment 245 adjacent with an end portion 300 of another conductor segment 245 as illustrated in FIG. 18(a). The range over which the insulating film 303a is removed at each end does not include an undeformed portion 303, i.e., the insulating film 303a is removed over a range corresponding to a plastically deformed area 301 and a tapered portion 302.

—Plastic Deformation Step (First Compression Step)—

In a plastic deformation step (first compression step) S210, pressure is applied to the pair of end portions 300 abutted to each other so as to hold the two end portions 300 together from the two outer sides facing opposite each other along the radial direction, i.e., so as to compress the end portions 300 along the radial direction, thereby forming plastically deformed portions 301, as shown in FIG. 18(b). Concurrently with the formation of the plastically deformed portions 301, a tapered portion 302 is formed between the plastically deformed portion 301 and the undeformed portion 303.

Through the forming process, the plastically deformed portions 301 are each formed into the shape of a rectangular column assuming a dimension bd1, measured along the circumferential direction, which is greater than a dimension by measured at the undeformed portion 303 along the circumferential direction and a dimension ad1, measured along the radial direction, smaller than a dimension ap measured at the undeformed portion 303 along the radial direction.

The tapered portion 302 includes four tapered surfaces. A pair of tapered surfaces 302a facing opposite each other along the circumferential direction of the stator 230, take on a dimension measured along the radial direction, which gradually becomes smaller as the tapered surface 302a ranges from the side where the undeformed portion 303 is present toward the plastically deformed portion 301. A pair of tapered surfaces 302b, facing opposite each other along the radial direction of the stator 230, each take on a dimension measured along the circumferential direction, which gradually becomes greater as the tapered surface 302a ranges from the side where the undeformed portion 303 is present toward the plastically deformed portion 301.

The pair of plastically deformed portions 301, achieved by compressing the end portions from the two outer sides facing opposite each other along the radial direction, are offset toward the contact surfaces where the end portions 300 contact each other relative to the corresponding undeformed portions 303.

—Plastic Deformation Step (Second Compression Step)—

In a plastic deformation step (second compression step) S220, pressure is applied to the plastically deformed portions 301 and the tapered portion 302, constituting initial formed portions, so as to compress them from the two outer sides facing opposite each other along the circumferential direction and thus, subsequent formed portions 320 are created as illustrated in FIG. 18(c). The subsequent formed portions 320 are formed so that their dimension bd2, measured along the circumferential direction, is less than the dimension of the slot 236 measured along the circumferential direction and so that the dimension 2×ad2 of the combined subsequent formed portions 320, measured along the radial direction, is smaller than the dimension of the slot 236 measured along the radial direction. This means that the subsequent formed portions 320 are formed to achieve a size that allows them to be inserted into a slot 236 from the side where one end surface of the stator core 236 is located.

It is desirable that the dimension bd2 of the subsequent formed portion 320, measured along the circumferential direction, be equal to or greater than the dimension by measured along the circumferential direction prior to the forming process. By forming the subsequent formed portions 320 assuming such a dimension, it is ensured that the area of a section of the weld metal to be formed in the subsequent welding step, taken along the circumferential direction will achieve a sufficient size.

—First Bending Step—

In a first bending step S230, the conductor segments 245 are each bent into a substantially U-shape.

—Conductor Insertion Step—

In a conductor insertion step S240, the conductor segments 245 are inserted through slots 236 from the side where one end surface of the stator core 232 is located (the side where the coil ends 249a are located in FIG. 5) and the end portions 300 of the conductor segments 245 are made to project out beyond the other end surface of the stator core 232 (on the side where the coil ends 249b are located in FIG. 5) (see FIG. 6(a)).

—Post-Insertion Alignment Step (Second Bending Step)—

In a post-insertion alignment step (second bending step) S250, the areas of the linear portions of the conductor segments 245 projecting out beyond the other end surface of the stator core 232 (on the side where the coil ends 249b are located in FIG. 5) are each bent toward the adjacent conductor segment 245, to which the portion is to be connected, the sides of the bent portions where the tips are located are further bent downward in the figure, and finally, the conductor segments 245 are aligned so as to position an end portion 300 belonging to a given conductor segment 245 adjacent to the corresponding end portion 300 of the adjoining conductor segment 245 (see FIG. 6(b), FIG. 6(c) and FIG. 18(c)).

—Welding Step—

In a welding step S260, the conductor segments 245 are welded together at the tops of the subsequent formed portions 320 through TIG welding or plasma arc welding. A weld metal 710 is formed over the tops of the subsequent formed portions 320.

In the second embodiment, the subsequent formed portions 320 resulting from plastic deformation are welded together. In the second embodiment, the thermal conductivity at the secondary form portions 320 is lowered in much the same way as that described in (1) in reference to the first embodiment. Thus, when the subsequent formed portions 320 are welded together at the tops thereof, it takes longer for the weld metal 710 to set or solidify, allowing the water vapor, having been generated during the welding step, to be fully released to the outside and thus, formation of blowholes inside the weld metal 710 can be reduced. It is to be noted that by forming the subsequent formed portions 320 achieving a dimension bd2 measured along the circumferential direction, which is equal to or greater than the dimension by measured along the circumferential direction prior to the forming process, it is ensured that the sectional area of the weld metal 710 sliced along the circumferential direction does not become too small. The second embodiment achieves an advantage similar to that described in (2) in reference to the first embodiment. The second embodiment further achieves an advantage described in (4) below.

(4) In the second embodiment, before the conductor segments 245 are inserted through the slots 236, the subsequent formed portions 320 are formed by first compressing the end portions of the conductor segments 245 along the radial direction of the stator 230 and then compressing them along the circumferential direction. The conductor segments 245 are then inserted through the slots 236 from the side where one end surface of the stator core 232 is located (the side where the coil ends 249a are located in FIG. 5) so as to allow the subsequent formed portions 320 to project beyond the other end surface of the stator core 232 (on the side where the coil ends 249b are located in FIG. 5). Once the conductor segments 245 are inserted through the slots 236, each pair of adjacent subsequent formed portions 320, among the subsequent formed portions 320 belonging to the plurality of conductor segments 245, are welded together at the tops thereof.

Unlike in the first embodiment, in which the end portions 300 are formed after the conductor segments 245 are inserted through the slots 236, the end portions 300 are formed before the conductor segments are inserted through the slots 236, thereby assuring better ease of work and an improvement in work efficiency in the second embodiment.

The following variations are also within the scope of the present invention, and one of the variations or a plurality of variations may be adopted in combination with either of the embodiments described above.

(1) While two conductor segments 245 are inserted through each slot 236 in the first and second embodiments described above, the present invention is not limited to this example. For instance, four or six conductor segments may be inserted through each slot 236, instead.

(2) The conductor segments 245 may assume a shape other than that described above. Namely, the conductor segments 245 may be formed into any of various shapes that allow one of the coil sides 241 of each conductor segment to be disposed on the inner side along the radial direction in a specific slot 236 and the other coil side 241 of the conductor segment to be disposed on the outer side along the radial direction in another slot 236.

(3) In the second embodiment described above, the end portions 300 of the conductor segments 245 are first compressed along the radial direction and then the end portions 300 of the conductor segments 245 are compressed along the circumferential direction through the plastic deformation steps. However, the present invention is not limited to this example. For instance, the end portions 300 of the conductor segments 245 may be first compressed along the circumferential direction and then the end portions 300 of the conductor segments 245 may be compressed along the radial direction. In addition, the number of compression steps is not limited to two, and the end portions 300 of the conductor segments 245 may instead be compressed alternately along the radial direction and along the circumferential direction through three or more compression steps.

(4) While the rotating electrical machines 200 and 202 achieved in the first and second embodiments described above are each a synchronous motor with permanent magnets 254 disposed at the rotor 250, the present invention is not limited to this example. For instance, it may be adopted in a rotating electrical machine configured as an induction motor.

It is to be noted that the embodiments and variations described above simply represent examples and the present invention is in no way limited to these examples as long as the features characterizing the present invention remain intact. Any other aspects conceivable within the technical range of the present invention should, therefore, be considered to be within the scope of the present invention.

The disclosure of the following priority application is herein incorporated by reference:
Japanese Patent Application No. 2012-29670 filed Feb. 14, 2012

The invention claimed is:

1. A rotating electrical machine, comprising:
a stator including a stator winding made up with a plurality of conductor segments each constituted with flat wire formed into a substantially U-shape installed through a plurality of slots formed in a stator core; and
a rotor rotatably disposed at an inner side of the stator, wherein:
the stator winding includes the plurality of conductor segments inserted through the slots from one end surface of the stator core with end portions of the conductor segments projecting out beyond another end surface of the stator core, and is formed by welding an end portion of each conductor segment, among the plurality of conductor segments, with an adjacent end portion of another conductor segment;
the conductor segments each include an undeformed portion, a plastically deformed portion formed at the end portions thereof and a tapered portion formed between the undeformed portion and the plastically deformed portion;
the plastically deformed portion is formed so that a dimension of the plastically deformed portion, measured along a circumferential direction of the stator, is greater than a dimension of the undeformed portion measured along the circumferential direction of the stator and so that a dimension of the plastically deformed portion, measured along a radial direction of the stator, is smaller than a dimension of the undeformed portion measured along the radial direction of the stator; and
the conductor segments are welded together at tops of the plastically deformed portions thereof.

2. A rotating electrical machine according to claim 1, wherein:
bd, representing the dimension of the plastically deformed portion measured along the circumferential direction of the stator, and bp, representing the dimension of the undeformed portion measured along the circumferential direction of the stator, achieve a relationship expressed as;

$bd/bp \geq 1.3$.

3. A rotating electrical machine according to claim 1 wherein:
ad, representing the dimension of the plastically deformed portion measured along the radial direction of the stator, and bd, representing the dimension of the plastically deformed portion measured along the circumferential direction of the stator, achieve a relationship expressed as;

$(2 \times ad)/bd \leq 2.5$.

4. A method for manufacturing a rotating electrical machine according to claim 1, wherein:
after the conductor segments are inserted through the slots from the one end surface of the stator core so as to allow the end portions thereof to project out beyond the other end surface of the stator core, the end portions are compressed along the radial direction of the stator so as to form the plastically deformed portion and the tapered portion.

5. A method for manufacturing a rotating electrical machine that includes a stator, including a stator winding made up with a plurality of conductor segments each constituted with flat wire formed into a substantially U-shape installed through a plurality of slots formed in a stator core, and a rotor, rotatably disposed at an inner side of the stator, comprising:
a plastic deformation step in which a plastically deformed portion is formed by compressing end portions of the conductor segments alternately along a radial direction of the stator and along a circumferential direction of the stator;
a conductor insertion step in which the conductor segments are inserted through the slots from one end surface of the stator core and the plastically deformed portion is made to project out beyond another end surface of the stator core; and
a welding step in which the plastically deformed portions set adjacent to each other among the plurality of conductor segments are welded together at tops thereof.

6. A method for manufacturing a rotating electrical machine according to claim 5, wherein:
in the plastic deformation step, the end portions of the conductor segments are deformed by first compressing the end portions of the conductor segments along the radial direction of the stator and then by compressing the end portions of the conductor segments along the circumferential direction of the stator.

* * * * *